United States Patent [19]

Masumoto

[11] Patent Number: 5,764,978
[45] Date of Patent: Jun. 9, 1998

[54] DATABASE SYSTEM HAVING A HIERARCHICAL NETWORK DATABASE AND A CORRESPONDING RELATIONAL DATABASE

[75] Inventor: Toshihiko Masumoto, Kobe, Japan

[73] Assignee: Fujitsu Limited, Kawasaki, Japan

[21] Appl. No.: 372,010

[22] Filed: Jan. 12, 1995

[30] Foreign Application Priority Data

Mar. 3, 1994 [JP] Japan ................... 6-033930

[51] Int. Cl.[6] ................... G06F 17/30
[52] U.S. Cl. ................... 395/611; 395/613
[58] Field of Search ................... 395/600, 611, 395/613, 604; 364/DIG. 11

[56] References Cited

U.S. PATENT DOCUMENTS 5,467,471 11/1995 Bader ................... 395/611
5,604,898 2/1997 Saijyo et al. ................... 395/604

OTHER PUBLICATIONS

"SIR: A Hierarchy of Heart Attacks", Paul Litwin, Data Based Advisor, v9, n3, p. 26(2), Mar. 1991.

Primary Examiner—Thomas G. Black
Assistant Examiner—Hosain T. Alam
Attorney, Agent, or Firm—Staas & Halsey

[57] ABSTRACT

A database system consisting of a network database and a relational database. When a modification is made to the network database, update log data about the modification is created by an update log creating portion. An updating portion searches an address table for the storage position of an address contained in the update log data according to this data. This address storage position is correlated to the relational database. Therefore, the updating portion can locate the position of a data item on the relational database according to the discovered address storage position. The updating portion updates this data item and reflects contents of updating of the network database in the relational database.

11 Claims, 31 Drawing Sheets

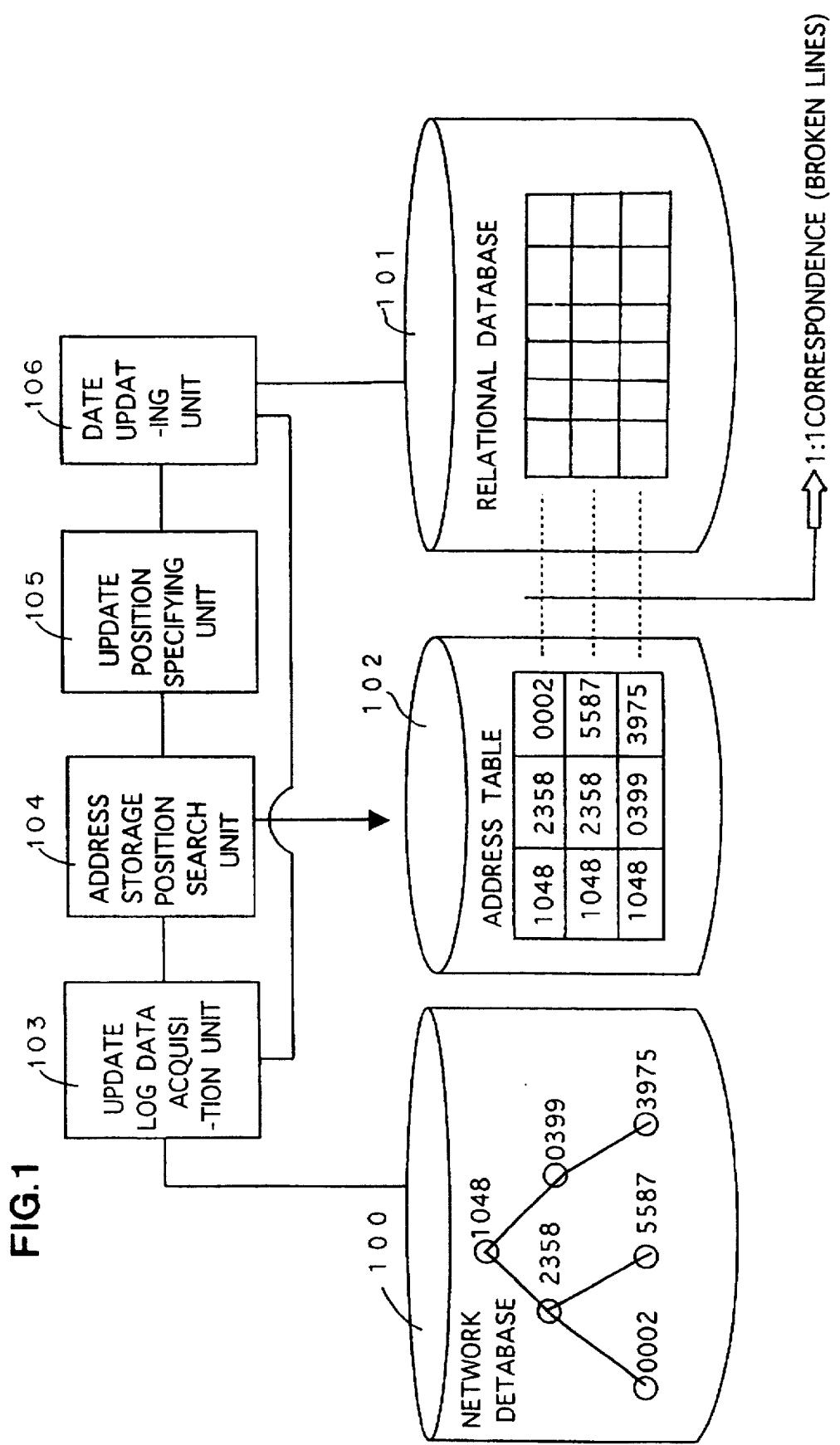

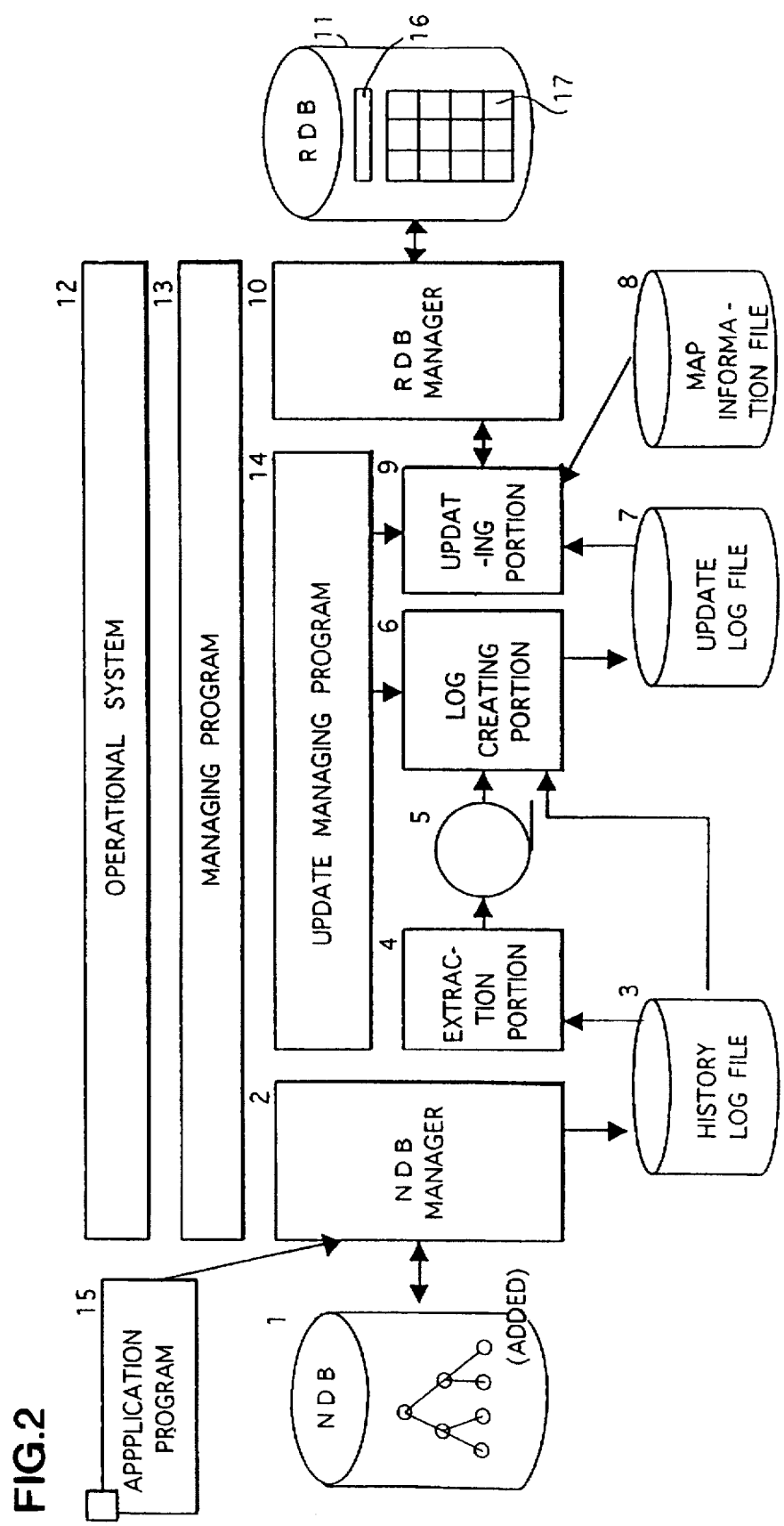

A : COMPANY NAME

B : POST

C : SECTION

D : PERSONAL NAME

FIG.4

| A-PGCS | B-PGCS | C-PGCS | D-PGCS | S-KEY |
|---|---|---|---|---|
| a 1 | b 1 | c 1 | d 1 | 000002 |
| a 1 | b 1 | c 1 | d 2 | 000003 |
| a 1 | b 1 | c 2 | d 3 | 000004 |
| a 1 | b 2 | c 3 | d 4 | 000001 |

FIG.5

REAL TABLE (IN FIG. 2) "SCHEMA 2, TABLE 2"

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 000001 |
| FUJITSU | 2ND DEVELOPING DIVISION | 3RD DEVELOPING SECTION | YASUTAKA ODA | 000002 |
| FUJITSU | 2ND DEVELOPING DIVISION | 3RD DEVELOPING SECTION | YUZO KIMURA | 000003 |
| FUJITSU | 2ND DEVELOPING DIVISION | 4TH DEVELOPING SECTION | TOSHIHIKO MASUMOTO | 000004 |

FIG.6

| ADDRESS | COLUMN IN ADDRESS TABLE | COLUMN IN ENTITY TABLE |
|---|---|---|
| a 1 | A - P G C S | DEVELOPING COMPANY |
| b 2 | B - P G C S | OPERATION DIVISION |
| b 2 | B - P G C S | OPERATION DIVISION |
| c 1 | C - P G C S | SECTION IN CHARGE |
| c 2 | C - P G C S | SECTION IN CHARGE |
| c 3 | C - P G C S | SECTION IN CHARGE |
| d 1 | D - P G C S | DEVELOPER |
| d 2 | D - P G C S | DEVELOPER |
| d 3 | D - P G C S | DEVELOPER |
| d 4 | D - P G C S | DEVELOPER |

F I G 1 2
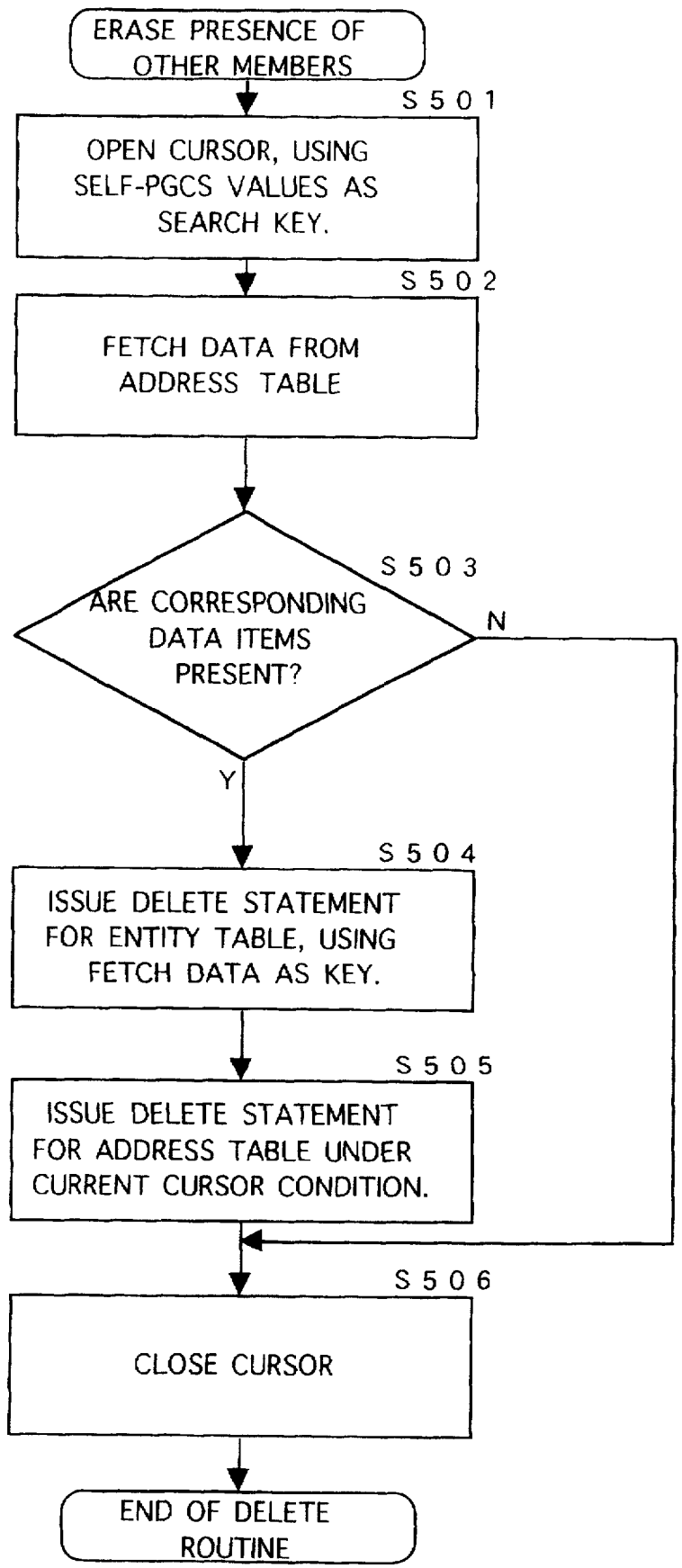

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 00001 |
| FUJITSU | 2ND DEVELOPING DIVISION | 3ND DEVELOPING SECTION | YASUTAKA ODA | 00002 |
| FUJITSU | 2ND DEVELOPING DIVISION | 3ND DEVELOPING SECTION | A. SENNA | 00003 |
| FUJITSU | 2ND DEVELOPING DIVISION | 4TH DEVELOPING DIVISION | TOSHIHIKO MASUMOTO | 00004 |

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 000001 |
| FUJITSU | 2ND DEVELOPING DIVISION | 3RD PROMOTING ROOM | YASUTAKA ODA | 000002 |
| FUJITSU | 2ND DEVELOPING DIVISION | 3RD PROMOTING ROOM | A. SENNA | 000003 |
| FUJITSU | 2ND DEVELOPING DIVISION | 4TH DEVELOPING DIVISION | TOSHIHIKO MASUMOTO | 000004 |

FIG 18

| c 9 | d 5 | | TOSHIAKI YAMADA | | INSERT |

FIG 19

| DEVELOPING COMPANY | OPERATION DIVISION | SECTION IN CHARGE | DEVELOPER | U-KEY |
|---|---|---|---|---|
| FIJITSU | 1ST DEVELOPING DIVISION | 2ND DEVELOPING SECTION | YUTAKA KAMADA | 00001 |

FIG 20

| FUJITSU | 1ST DEVELOPING DIVISION | 2ND DEVELOPING SECTION | TOSHIAKI YAMADA | 000005 |

F I G 2 1

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 000001 |
| FUJITSU | 2ND DEVELOPING DIVISION | 3RD PROMOTING ROOM | YASUTAKA ODA | 000002 |
| FUJITSU | 2ND DEVELOPING DIVISION | 3RD PROMOTING ROOM | A. SENNA | 000003 |
| FUJITSU | 2ND DEVELOPING DIVISION | 4TH DEVELOPING SECTION | TOSHIHIKO MASUMOTO | 000004 |
| FUJITSU | 1ST DEVELOPING DIVISION | 2ND DEVELOPING SECTION | TOSHIAKI YAMADA | 000005 |

FIG 22

| b 2 | c 4 | EDUCATIONAL SECTION | INSERT |

FIG 23

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 000001 |

FIG 24

| FUJITSU | 1ST DEVELOPING DIVISION | EDUCATION SECTION | ――― | 000006 |

F I G 2 5

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SEC. | YUTAKA KAMADA | 000001 |
| FUJITSU | 2ND DEVELOPING DIVISION | 3RD PROMOTING ROOM | YASUTAKA ODA | 000002 |
| FUJITSU | 2ND DEVELOPING DIVISION | 3RD PROMOTING ROOM | A. SENNA | 000003 |
| FUJITSU | 2ND DEVELOPING DIVISION | 4TH DEVELOPING SECTION | TOSHIHIKO MASUMOTO | 000004 |
| FUJITSU | 1ST DEVELOPING DIVISION | 2ND DEVELOPING SECTION | TOSHIAKI YAMADA | 000005 |
| FUJITSU | 1ST DEVELOPING DIVISION | EDUCATIONAL SECTION | — | 000006 |

FIG 27

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 000001 |
| FUJITSU | 2ND DEVELOPING DIVISION | 3RD PROMOTING ROOM | YASUTAKA ODA | 000002 |
| FUJITSU | 2ND DEVELOPING DIVISION | 4TH DEVELOPING SECTION | TOSHIHIKO MASUMOTO | 000004 |
| FUJITSU | 1ST DEVELOPING DIVISION | 2ND DEVELOPING SECTION | TOSHIAKI YAMADA | 000005 |
| FUJITSU | 1ST DEVELOPING DIVISION | EDUCATIONAL SECTION | —— | 000006 |

FIG 28

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 000001 |
| FUJITSU | 2ND DEVELOPING DIVISION | 3RD PROMOTING ROOM | —————— | 000002 |
| FUJITSU | 2ND DEVELOPING DIVISION | 4TH DEVELOPING SECTION | TOSHIHIKO MASUMOTO | 000004 |
| FUJITSU | 1ST DEVELOPING DIVISION | 2ND DEVELOPING SECTION | TOSHIAKI YAMADA | 000005 |
| FUJITSU | 1ST DEVELOPING DIVISION | EDUCATIONAL SECTION | —————— | 000006 |

FIG. 29

| A-PGCS | B-PGCS | C-PGCS | D-PGCS | S-KEY |
|--------|--------|--------|--------|--------|
| a 1 | b 1 | c 1 | — | 000002 |
| a 1 | b 1 | c 2 | d 3 | 000004 |
| a 1 | b 2 | c 3 | d 4 | 000001 |
| a 1 | b 2 | c 3 | d 5 | 000005 |
| a 1 | b 2 | c 4 | — | 000006 |

F I G 3 0

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | 2ND DEVELOPING SECTION | YUTAKA KAMADA | 000001 |
| FUJITSU | 2ND DEVELOPING DIVISION | 4TH DEVELOPING SECTION | TOSHIHIKO MASUMOTO | 000004 |
| FUJITSU | 1ST DEVELOPING DIVISION | 2ND DEVELOPING SECTION | TOSHIAKI YAMADA | 000005 |
| FUJITSU | 1ST DEVELOPING DIVISION | EDUCATIONAL SECTION | ——— | 000006 |

FIG31

| A-PGCS | B-PGCS | C-PGCS | D-PGCS | S-KEY |
|---|---|---|---|---|
| a1 | b1 | c2 | d3 | 000004 |
| a1 | b2 | c3 | d4 | 000001 |
| a1 | b2 | c3 | d5 | 000005 |
| a1 | b2 | c4 | — | 000006 |

FIG32

| c4 | d6 | KATSUTOSHI MASATOMI | INSERT |
|---|---|---|---|

F I G 3 3

| DEVELOPING COMPANY | OPERATION DIVISION | SECTION IN CHARGE | DEVELOPER | U-KEY |
|---|---|---|---|---|
| FUJITSU | 1ST DEVELOPING DIVISION | EDUCATIONAL SECTION | —— | 000006 |

FIG 34

REAL TABLE

| DEVELOPING COMPANY | OPERATION DIVISION | SECTION IN CHARGE | DEVELOPER (PERSON'S NAME) | U-KEY |
|---|---|---|---|---|
| FUJITSU | 1ST DEVELOPING DIVISION | 2ND DEVELOPING SECTION | YUTAKA KAMADA | 000001 |
| FUJITSU | 2ND DEVELOPING DIVISION | 4TH DEVELOPING SECTION | TOSHIHIKO MASUMOTO | 000004 |
| FUJITSU | 1ST DEVELOPING DIVISION | 2ND DEVELOPING SECTION | TOSHIAKI YAMADA | 000005 |
| FUJITSU | 1ST DEVELOPING DIVISION | EDUCATIONAL SECTION | KATSUTOSHI MASATOMI | 000006 |

F I G 3 5

| A-PGCS | B-PGCS | C-PGCS | D-PGCS | S-KEY |
|---|---|---|---|---|
| a 1 | b 1 | c 2 | d 3 | 000004 |
| a 1 | b 2 | c 3 | d 4 | 000001 |
| a 1 | b 2 | c 3 | d 5 | 000005 |
| a 1 | b 2 | c 4 | d 6 | 000006 |

FIG 38

| COLUMN I | COLUMN II | COLUMN III | LINK |
|---|---|---|---|
| A | B⁺ | C | a1b1c1 |
| A | B⁺ | D | a1b1c2 |
| A | E | F | a1b2c3 |

17

| LINK | ADDRESS I | ADDRESS II | ADDRESS III |
|---|---|---|---|
| a1b1c1 | a1 | b1 | c1 |
| a1b1c2 | a1 | b1 | c2 |
| a1b2c3 | a1 | b2 | c3 |

16

DATABASE SYSTEM HAVING A HIERARCHICAL NETWORK DATABASE AND A CORRESPONDING RELATIONAL DATABASE

BACKGROUND OF THE INVENTION

1. Field of the Invention

The present invention relates to a database system consisting of a network database and a relational database and also to a method of updating such a database system.

2. Description of the Related Art

Network databases and relational databases have been heretofore known as databases. A network database is a database based on a network model. This network database stores data in a hierarchical structure and is organized as a network structure that permits existence of plural higher-level records for a single record. In this network database, the set membership is conceptually expressed in terms of a tree. A relational database is a database based on a relational model. This relational model is a data model in which a data structure is expressed in the form of a two-dimensional table. In this relational model, each row corresponds to each individual entity, while each column corresponds to each individual attribute.

Of these databases, the network database permits high-speed data retrieval and so this database is adequately used as a database on which a user accesses data. On the other hand, the relational database has a large capacity and so it can be appropriately used as a database on which an administrator performs operations to process information. Therefore, in order to make use of the advantages of these two kinds of databases, it is desired to build a database system where a network database and a relational database coexist.

In this case, however, it is necessary that the contents of both databases are coincident. For example, if certain data items stored in the network database are updated, it is necessary to simultaneously update their corresponding data items stored in the relational database. That is, it is necessary that the contents of updating be reflected in the relational database. However, it is not rational in view of the frequency of data updating to update the contents of the relational database whenever the data in the network database is updated. Therefore, when a certain amount of data to be updated accumulates, the relational database is updated by batch-processing.

In the prior art method of reflecting data for a database system, data cannot be fetched from the network database unless data items beginning with a data item at the owner position, or at the highest level, and ending with a data item at the lowest level, are regarded as one continuous data string. In other words, it has been impossible to fetch only a part of the data stored in the network database.

Accordingly, even if data items updated on the network database are of only one record type (one unit of data in accessing the database) located in an arbitrary position, the whole network database must be rewritten, based on the data string extending from the owner position to the lowest level.

In this way, in the prior art database system, the time required only to match both databases is comparable to the time taken to organize the relational database. Consequently, the frequency at which both databases are matched is inevitably limited. This increases the gap in contents between both databases. Also, updates are done with increased time lags. Because it takes a long time to match both databases, the possibility that the data produces a fault is increased accordingly.

SUMMARY OF THE INVENTION

It is a main object of the present invention to provide a database system and method of updating it which solves the foregoing problems with the prior art techniques and which, when data in a network database is updated, can quickly reflect the contents of updating in a relational database.

It is another object of the invention to provide a database system and method of updating it which, when data in a network database is updated, can reflect the contents of updating in a relational database simply by updating a part of the contents of the relational database.

A database system according to the present invention is a database system comprising a network database having data in the form of a hierarchical structure and a relational database consisting of a table for storing data items corresponding to the hierarchy of data in the relational database. The novel database system comprises an address table, an update log data acquisition means, an address storage position search means, an update position specifying means, and a data updating means. The address table stores the addresses of individual data items held in the network database in a table where every record ranging from the highest level of hierarchy to the lowest level forms a row. The address table makes the address storage positions of date items in the network database correspond to data storage positions in the relational database. When data in the network database is updated, the update log data acquisition means gains update log data including the addresses of the updated data items and the contents of updating. The address storage position search means searches the address table for the address storage positions of the updated data according to the update log data gained by the update log data acquisition means. The update position specifying means locates the positions of data items on the relational database corresponding to the address storage positions of the updated data items on the address table located by the address position search means. The data updating means updates data in those positions on the relational database which are specified by the update position specifying means, according to the update log data.

A method of updating a database system according to the present invention is implemented for a database system comprising both a network database having data in the form of a hierarchical structure and a relational database. This relational database stores the individual data items held in the network database in a table where every record ranging from the highest level of hierarchy to the lowest level forms a row. The same data is stored in both databases. In the present invention, the addresses of individual data items in the network database and the positions of the data items in the relational database have been previously specified by the address table to make the network database correspond to the relational database. When data in the network database is updated, update log data including the addresses of the updated data items and the contents of the updating is obtained. According to this update log data, the address table is searched for the address storage positions of the updated data items. Then, those data items on the relational database which correspond to these address storage positions are specified. Finally, data items which are specified as data items to be updated on the relational database are updated according to the update log data.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a diagram of a database system according to a first embodiment of the present invention;

FIG. 2 is a diagram of a database system according to a second embodiment of the present invention;

FIG. 4 is a diagram illustrating the address table shown in FIG. 2;

FIG. 5 is a diagram illustrating the entity table shown in FIG. 2;

FIG. 6 is a table of MAP information files used in the database system shown in FIG. 2;

FIG. 12 is a flowchart illustrating an ERASE subroutine executed in step 406 or 407 of the processing illustrated in FIG. 10 or in step 413 of the processing illustrated in FIG. 11 when other members are present;

FIG. 18 is a diagram illustrating an update log created by the update log creating portion illustrated in FIG. 2 when an insertion is made;

FIG. 19 is a diagram illustrating a record gained according to the update log illustrated in FIG. 16;

FIG. 20 is a diagram illustrating a new record created from the record illustrated in FIG. 19;

FIG. 21 is a diagram illustrating the entity table updated by adding the new record illustrated in FIG. 20;

FIG. 22 is a diagram illustrating an update log created by the update log creating portion illustrated in FIG. 2 when an insertion is made;

FIG. 23 is a diagram illustrating a record gained according to the update log illustrated in FIG. 22;

FIG. 24 is a diagram illustrating a new record created from the record illustrated in FIG. 23;

FIG. 25 is a diagram illustrating the entity table updated by adding the new record illustrated in FIG. 24;

FIG. 27 is a diagram illustrating the entity table updated according to the update log I illustrated in FIG. 26;

FIG. 28 is a diagram illustrating the entity table updated according to the update log II illustrated in FIG. 26;

FIG. 29 is a diagram illustrating the address table updated according to the update log II illustrated in FIG. 26;

FIG. 30 is a diagram illustrating the entity table updated according to the update log III illustrated in FIG. 26;

FIG. 31 is a diagram illustrating the address table updated according to the update log III illustrated in FIG. 26;

FIG. 32 is a diagram illustrating an update log created by the update log creating portion shown in FIG. 2 when an insertion is made;

FIG. 33 is a diagram illustrating a record obtained according to the update log illustrated in FIG. 32;

FIG. 34 is a diagram illustrating the entity table updated according to the update log illustrated in FIG. 32;

FIG. 35 is a diagram illustrating the address table updated according to the update log illustrated in FIG. 32;

FIG. 38 is a diagram illustrating the entity table and the address table in which an update has been made;

DESCRIPTION OF THE PREFERRED EMBODIMENTS

FIRST EMBODIMENT

Figure 3:
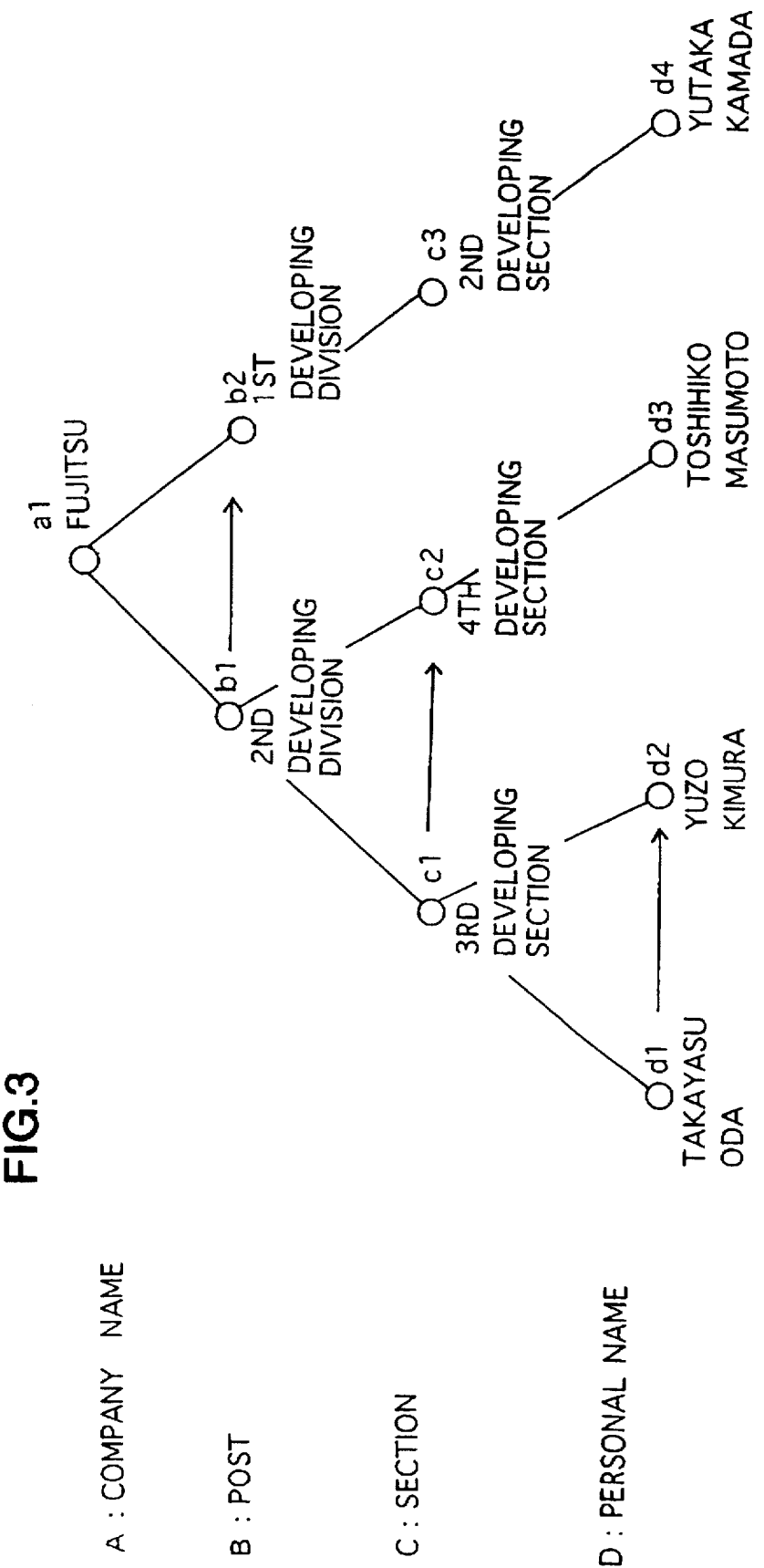
FIG. 3 is a diagram of the network database shown in FIG. 2.

FIG. 1 is a diagram illustrating the structure of a database system according to a first embodiment of the present invention. This database system comprises a network database 100 having data in the form of a hierarchical structure and a relational database 101 containing a table of data items corresponding to the hierarchical levels of data in the network database 100. The present embodiment is an apparatus for causing the contents of the network database 100 to be quickly and smoothly reflected in the relational database 101. Therefore, the present embodiment comprises an update log data acquisition unit 103, an address table 102, an address storage position search unit 104, an update position specifying unit 105, and a data updating unit 106. The update log data acquisition unit 103 is connected with the network database 100. The address storage position search unit 104 is connected with the update log data acquisition unit 103 and also with the address table 102. The update position specifying unit 105 is connected with the address storage position search unit 104. The data updating unit 106 is connected with all of the update position specifying unit 105, the update log data acquisition unit 103, and the relational database 101. These components of the present embodiment are hereinafter described separately.

[Network Database]

The network database 100 is a database in which data items are interrelated in the form of a hierarchical structure. Therefore, conceptually, the network database 100 contains a so-called hierarchical database. The network database 100 may have a data network structure. Thus, the network database 100 so structurized can cover all the interrelations among data items which can be specified by the relational database 101.

[Relational Database]

The relational database 101 is a database which stores data items in the form of a table according to the hierarchy of the data in the network database 100. It is to be noted that the number of table or tables forming this relational database 101 is not limited to one. That is, if conditions under which plural tables are interconnected are satisfied, or if the correspondence with the network database 100 is satisfied, the database 101 may comprise plural tables.

In the present embodiment, data in the network database 100 is used while reflected in the relational database 101, for the following reason. If data is updated on the network database 100, high speed is accomplished, which is convenient for an end user. However, it is easier for a data administrator to manage the relational database 101.

[Address Table]

The address table 102 is a table in which the addresses of data items of the network database 100 are stored. In this table, every record ranging from the highest level of data hierarchy to the lowest level forms a row. The address table 102 makes the address storage positions of data items correspond to data positions in the relational database 101. For this correspondence, a uniqueness display portion is given to each of the relational database 101 and the address table 102. Their uniqueness display portions in the corresponding rows may have the same value. In this case, the address table 102 and the relational database 101 can be separately managed. In addition, the order in which data items or records are arrayed in these table and relational database can be made random. The address table 102 and the relational database 101 may be combined into one table so that they may be interrelated. Where they are separate tables, the address table may be contained in the relational database 101.

[Update Log Data Acquisition Unit]

When data in the network database 100 is updated, the update log data acquisition unit 103 acquires update log data containing the addresses of updated data and the contents of the updating. The "update" referred to herein contains modifications, additions, and erasure of data.

[Address Storage Position Search Unit]

The address storage position search unit 104 searches the address table 102 for the address storage positions of updated data, according to the update log data obtained by the update log data acquisition unit 103. The search unit 104 may search only the row containing the addresses of updated data, or the search unit 104 may search rows and columns. In the former case, column names are previously assigned to the columns of the address table 102. An information table specifying the relation of the addresses to the column names is prepared. A row is specified from the column name corresponding to one address and from this address.

[Update Position Specifying Unit]

According to the address of updated data item on the address table 102 located by the address storage position search unit 104, the update position specifying unit 105 determines the position of the updated data item on the relational database 101 corresponding to that address. Where the uniqueness display portions are provided to make the address table 102 correspond to the relational database 101, the update position specifying unit 105 refers to these display portions and specifies the positions of data items on the relational database 101 corresponding to the updated data items in the network database 100. Where the address storage position search unit 104 searches only rows, the update position specifying unit 105 specifies the corresponding row and specifies a column by referring to the update log data.

[Data Updating Unit]

The data updating unit 106 updates data stored in those positions on the relational database 101 which are specified by the update position specifying unit 105 according to an update log.

In the structure of the present embodiment described thus far, when data stored in the network database 100 is updated, the update log data acquisition unit 103 acquires update log data containing the addresses of the updated data and the contents of the updating.

The address storage position search unit 104 receives this update log data. Then, the search unit 104 searches the address table 102 for the positions at which these addresses are stored, according to the addresses of the update data contained in the update log data. This address storage position is correlated to the relational database 101.

Accordingly, the update position specifying unit 105 can specify the positions of data items on the relational database 101, according to the address storage positions searched for by the address storage position search unit 104. At the specified position, data items corresponding to the updated data stored in the network database 100 are previously stored. Consequently, the data updating unit 106 can update the data so that the contents of updating in the network database 100 are reflected in the relational database 101.

The present embodiment is based on a database system using both a network database and a relational database and can be applied to a bank deposit system or the like.

SECOND EMBODIMENT

<System Structure>

FIG. 2 shows the structure of a database system according to a second embodiment of the present invention. In FIG. 2, a managing program for managing the whole database system is indicated by reference numeral 13. This managing program 13 is run on an operational system 12 and contains an update management program 14 for performing various control operations regarding updating.

A network database 1 is managed by an NDB manager 2. The NDB manager 2 is controlled by the managing program 13. The manager 2 searches the network database 1 as requested by an application program 15. The NDB manager 2 sends obtained data to the application program 15. If necessary, the manager 2 updates data stored in the network database 1. Where data is updated, the NDB manager 2 records commands for updating into a history log file 3, the commands assuming the form of log data. The log data is written in NDL statements.

An extraction portion 4 is controlled by the update management program 14 and extracts requisite data from log data accumulated in the history log file 3. A communication portion 5 is controlled by the update management program 14, transforms data extracted by the extraction portion 4 into a form adapted for communication, and sends the transformed data to the relational database side.

An update log creating portion 6 is controlled and managed by an input task executed by the update management program 14. That is, on receiving data from the communication portion 5, the update log creating portion 6 creates an update log from the received data. This update log is composed of the address (self-address) on the network database 1 of the updated data, the address (higher-level address) of data (owner data) located at a higher level of hierarchy than the updated data, the entity value of the updated data, and the method of update (modification, insertion, or erasure). The created update log is accumulated in an update log file 7. The status in which update logs are accumulated in the update log 7 is managed by an input task according to the update management program 14. The components ranging from the NDB manager 2 to the update log creating portion 6 correspond to an update log acquisition means.

An updating portion 9 is controlled by an update task executed by the update management program 14. Specifically, the updating portion 9 successively reads update logs from the update log file 7 one by one and updates the relational database 11 via an RDB manager 10 according to the contents of each update log. This updating portion 9 corresponds to an address search means, an update position specifying means, and a data updating means.

An entity table 17 acting as an intrinsic relational database and an address table 16 for correlating the network database 1 with the entity table 17 are stored in the relational database 11. This database 11 is managed by the RDB manager 10 which is controlled by the managing program 13. The updating portion 9 refers to the contents of a MAP information file 8 when the relational database 11 is updated, the file 8 acting as an information file.

<Data Structure of Network Database 1>

FIG. 3 shows an example of the structure of data in the network database 1. As shown in this figure, data items are interrelated so as to form a hierarchical structure in the network database 1. A common attribute is imparted to all data items, that is entity values, at each one level of hierarchy. In the present embodiment, the attribute of the highest level (owner position, entry) A is a "COMPANY NAME". Its entity value is "FUJITSU (address value=a1)". The attribute of the second level B is a "POST", and its entity values are the "SECOND DEVELOPING DIVISION (address value=b1)" and the "FIRST DEVELOPING DIVISION (address value=b2)", respectively. The attribute of the third level C is a "SECTION", and its entity values are the "THIRD DEVELOPING SECTION (address value=c1)", the "FOURTH DEVELOPING SECTION (address value=c2)", and the "SECOND DEVELOPING SECTION (address value=c3)", respectively. The attribute of the fourth level D is a "PERSONAL NAME". Its entity values are "YASUTAKA ODA (address value=d1)", "YUZO KIMURA (address value=d2)", "TOSHIHIKO MASUMOTO (address value=d3)", and "YUTAKA KAMADA (address value=d4)", respectively.

In the present embodiment, the data item at the owner position is only one ("FUJITSU"), as mentioned above. Each of data items at lower levels is correlated with only one data item at a higher level (owner data). That is, an inverted tree structure is formed. The branches of this tree, i.e., links from data items in the owner position to certain data items at the lowest level, are known as records.

The horizontally directed arrows at each level shown in FIG. 3 show the logical order among entity values.

<Data Structure of Address Table 16>

FIG. 4 shows an example of the structure of data in the address table 16 which has been added to the relational database 11. During an initial extraction operation preceding updating of the network database 1, the address table 16 is created from address values of various record types in the network database 1.

This address table 16 is a two-dimensional table in which the horizontal parts, or rows indicate records, while the vertical parts indicate columns. Every record in the address table 16 corresponds to any one of the records in the network database 1. The columns A-PGCS through D-PGCS of the address table 16 correspond to the hierarchical levels of the network database 1. The column S-KEY is an uniqueness assuring column acting as a uniqueness display portion.

Information written to the address table 16 is address values of data items written at those positions in the network database 1 which correspond to their records and columns. Since the records in the address table 16 are equal in number with the records in the network database 1, the same address values are written in plural records. Information written to the column S-KEY is serial numbers for identification of each record. <Structure of Data in Entity Table 17 (User's Table)>

FIG. 5 shows an example of the structure of data in the entity table 17. This table 17 acts as an intrinsic relational database for holding entity values.

The entity table 17 is a two-dimensional table in which the horizontal parts, or rows indicate records, while the vertical parts indicate columns. Every record in the entity table 17 corresponds to any one of the records in the network database 1. However, the order of the records is not always coincident with the order of the records in the address table 16. Those columns of the entity table 17 which are given names "DEVELOPING COMPANY" through "DEVELOPER", respectively, correspond to the attributes of the levels of the network database 1. The column given the name "U-KEY" is a uniqueness assuring column serving as a uniqueness display portion.

Information written to the entity table 17 is none other than entity values written at those positions in the network database 1 which correspond to their records and columns. Since the records in the entity table 17 are equal in number with the records in the network database 1, the same entity value is written to plural records. Information written to the column U-KEY is serial numbers for identification of each record. The same serial number is given to the record in the address table 16 and to the record in the entity table 17 which correspond to the same record in the network database 1. Therefore, the record in the entity table 17 which corresponds to some record in the address table 16 can be found by comparing the column S-KEY in the address table 16 with the column U-KEY in the entity table 17.

<Structure of Data in MAP Information File 8>

FIG. 6 is a table showing an example of the structure of data in the MAP information file 8. This file 8 is a table which lists the addresses of all data items stored in the network database 1, the names of columns in the address table 16 storing the addresses, and the names of columns in the entity table 17 storing the data items.

<Processing for Updating>

Processing performed by the updating portion 9 to update data is described by referring to the flowcharts of FIGS. 7–13.

The updating task indicated by these flowcharts starts the processing in response to a prompting instruction from the input task which is managing the update log. This updating task is executed at any time when the number of updates regarding the network database 1 reaches a certain number. Accordingly, when the updating task is carried out, it follows that records of numerous updates are contained in the log data from the network database 1.

The updating task is started with step 101, where a START SQL statement is issued. That is, start of a transaction according to the SQL statement is declared. The SQL statement is written in a standard database language which is standardized by database language SQLX3005-1990 JIS Handbook "Information Processing Software, 1990" published by the Standard Association of Japan.

In the next step 102, the MAP information file 8 is searched for those column names in the entity table 17 which correspond to the addresses (self-address and higher-level address) contained in the update log.

In the next step 103, the MAP information file 8 is searched for those column names in the address table 16 which correspond to the addresses (self-address and higher-level address) contained in the update log.

Subsequently, the process enters a loop starting with 104 and ending with step 107, 108, or 109. In this loop, step 105 and the following steps are executed whenever a new update log is received from the input task.

In step 104, a decision is made as to whether the loop is informed of EOF (end of file) from the input task. The EOF indicates that no unprocessed update logs are left. If the EOF is given, the process proceeds to step 110; otherwise the process proceeds to step 105. If control first goes to this step 104, then control goes, of course, to step 105.

In step 105, the format of the log data is converted from a format adapted for communication to the RDB format. The reason is as follows. The log data was converted into a data format adapted for communication and transmitted from the communication portion 5 to this updating portion 9. To permit the log data to be treated by the RDB manager 10, the data is converted into the RDB format.

In the subsequent step 106, the kind of the update macro contained in the update log is judged. An operation to be performed next is selected according to the judged macro kind. In particular, instruction statements in the network database 1 are written in NDL statements. In these NDL statements, a modification is given by "MODIFY". An insertion is given by "STORE". An erasure is given by "ERASE". In SQL statements, these are "UPDATE", "INSERT", and "DELETE", respectively. In step 106, these kinds are judged. If it is "STORE", the process proceeds to step 107 which is STORE macro processing. If it is "MODIFY", control goes to step 108 which is MODIFY macro processing. If it is "ERASE", control proceeds to step 109 which is ERASE macro processing.

After execution of the loop described above, if the input task informs the processor of the EOF, then the process proceeds from step 104 to step 110. In this step 110, a COMMIT WORK END SQL statement (COMMIT statement) is issued. This COMMIT statement informs the processor that processing of the SQL statement executed thus far is completed. If this step 110 is carried out, processing of this updating task ends.

Figure 7:
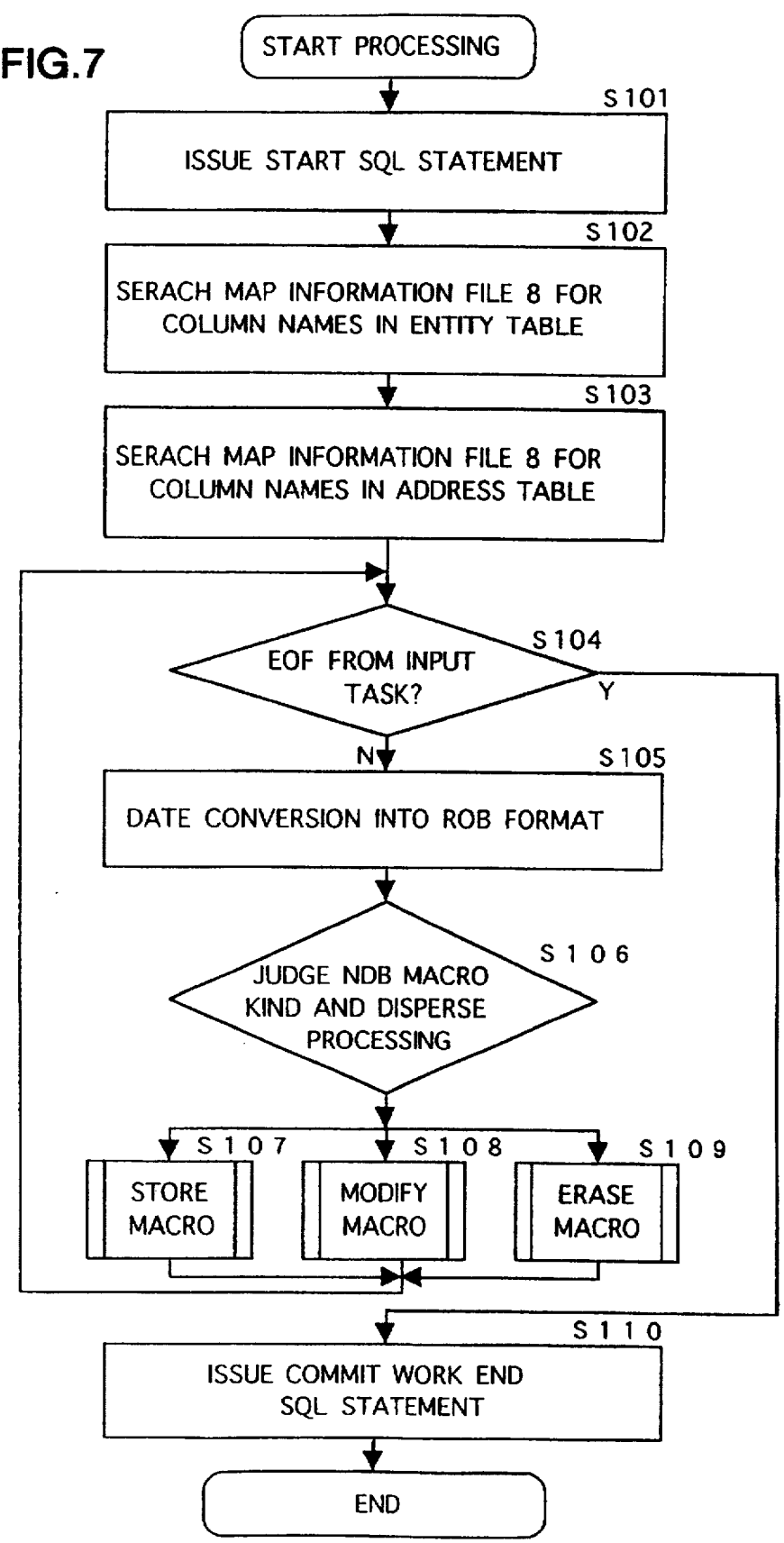
FIG. 7 is a flowchart illustrating processing of update tasks executed by the updating portion of the database system shown in FIG. 2.
Figure 8:
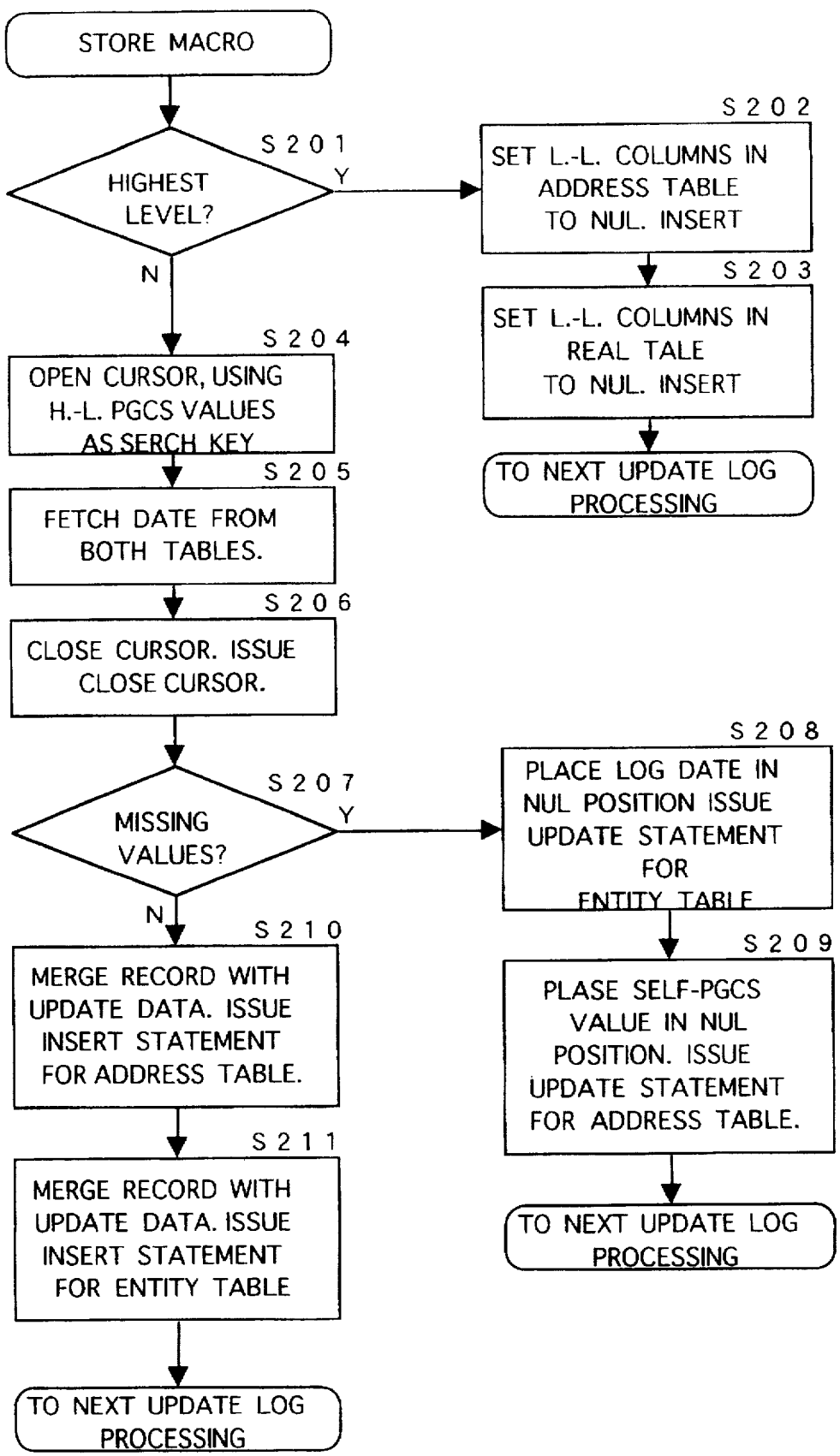
FIG. 8 is a flowchart illustrating a subroutine of STORE micro processing executed in step 107 of the processing illustrated in FIG. 7.

FIG. 8 illustrates a subroutine for STORE macro processing executed in step 107 illustrated in FIG. 7. The first step 201 illustrated in FIG. 8 makes a decision as to whether the update log which is currently processed is to update a data in a column corresponding to the highest level of the hierarchy of the network database 1.

If the update log is to update a data in a column corresponding to the highest level of the hierarchy, insertion (INSERT) is done, with data for lower-level columns in the address table 16 missing (NULL)(step 202). That is, the following SQL statement is generated:

```
INSERT INTO SCHEMA1. TABLE1
(A-PGCS, B-PGCS, C-PGCS, D-PGCS)
VALUES (:H, :H, . . ., :H)
``` where "SCHEMA1" and "TABLE1" are schema name and table name of the address table 16, respectively. The number of host variables (":H") is same as the number of columns excluding column S-KEY in the address table 16 ("TABLE1"). The host variables (":H") are address values written by the updating. The contents of this SQL statement are that a record in which entity values of host variables (":H") are written to the columns having specified column names ("A-PGCS, . . . , D-PGCS"), respectively, is inserted to the address table 16 ("TABLE1"). In the processing of this step 202, the address values of updated data in the update log are written only to the host variable (":H") corresponding to "A-PGCS". What are written to the other host variables (":H") are missing values (NULL). A new value according to the unique constraint is written to the column S-KEY.

In the next step 203, insertion (INSERT) is done, with that data for lower-level columns in the entity table 17 are missing (NULL). That is, the following SQL statement is issued:

```
INSERT INTO SCHEMA2. TABLE2
(DEVELOPING COMPANY, OPERATION DIVISION,
SECTION IN CHARGE, DEVELOPER)
VALUES (:H,:H,....:H)
``` where "SCHEMA2" and "TABLE2" are schema name and table name of the entity table 17, respectively. The number of host variables (":H") is same as the number of columns excluding column U-KEY in the entity table 17 ("TABLE2"). The host variables (":H") are entity values written by the updating. The contents of this SQL statement are that a record in which entity values of host variables (":H") are written to the columns having the specified column names ("DEVELOPING COMPANY, DEVELOPING DIVISION, SECTION IN CHARGE, DEVELOPER"), respectively is inserted to the specified entity table 17. In the processing of this step 203, the entity values of updated data contained in the update log are written only to the host variables (":H") corresponding to "developing company". What are written to the other host variables (":H") are missing values (NULL). Because of the unique constraint, the same value as the value of the S-KEY of the record inserted in step 202 is written into the column U-KEY.

After the processing of step 203, this subroutine is ended, and process returns to the processing illustrated in FIG. 7, where processing about the next update log is performed.

If the result of the decision made in step 201 is that the column is not located at the highest level of the hierarchy, then a cursor is opened, using a higher-level address (PGCS) value contained in the update log as a search key (step 204). That is, the following SQL statement is issued:

```
OPEN CUR1
SELECT * FROM SCHEMA1. TABLE1, SCHEMA2.
TABLE 2
WHERE X-PGCS = :H
AND S-KEY = U-KEY
``` where "CUR1" is a example of name of the cursor declared. In the "X-pgcs" a concrete name of the higher-level PGCS column corresponding to the level of hierarchy of the higher-level address contained in the update log is described. The higher-level address value of update data contained in the update log is described into the host variables (":H") thereof. "S-KEY" is a link column name of the address table 16. "U-KEY" is a link column name of the entity table 17. The contents of this SQL statement are that a cursor ("CUR1") that the specified address table 16 ("TABLE1") is searched for all data items of records whose higher-level PGCS columns have the same address as the host variables (":H") and that the specified entity table 17 ("TABLE2") is searched for all data items of records having the U-KEY values of the same values as the S-KEY of the located records is declared.

In the next step 205, data is fetched from the entity table 17 and from the address table 16, using a FETCH statement. That is, the following SQL statement is issued:

FETCH CUR1
INTO :H, . . . :H where the number of the host variables (":H") is same as the sum of the number of columns in the address table 16 ("TABLE1") and the number of columns in the entity table 17 ("TABLE2"). Only a definition is written to the host variables (":H"). The contents of this SQL statement are that operation of the cursor ("CUR1") declared in step 204 is performed and that data defined in terms of host variables (":H") are fetched.

In the next step 206, the cursor is closed. That is, the following SQL statement is issued:

CLOSE CUR1

The contents of this SQL statement are that end of use of the cursor ("CUR1") declared in step 204 is declared.

In the next step 207, a decision is made as to whether data, or records, fetched in step 205 have missing values (NULL) at positions corresponding to the level of hierarchy of the self-address.

If there exist missing values, control goes to step 208, where entity values after updating contained in the log data are placed in the missing value positions. An UPDATE statement is issued for the entity table 17, using the data obtained in step 205 as a search key. That is, the following SQL statement is issued:

```
UPDATE SCHEMA2. TABLE2
SET COLUMN NAMES = :H
WHERE NORMAL ITEM COLUMN NAMES = :H
U-KEY = :H
``` where, in the "COLUMN NAMES", concrete names of columns corresponding to the self-address contained in the update log is described. The host variables (":H") corresponding to the "COLUMN NAMES" are the entity values of updated data contained in the update log. The number of the specified "COLUMN NAMES" is equal to the number of data items contained in the update log. In the "NORMAL ITEM COLUMN NAME" and their host variables (":H"), some of the data items obtained in step 205 are entered. Into the host variables (":H") corresponding to the "U-KEY", the values of the U-KEY obtained in step 205 are entered. The contents of the SQL statement are that the entity value of the host variables (":H") corresponding the "COLUMN NAME" is overwritten to the column specified by the "COLUMN NAME" of the record specified under "WHERE" condition in the specified entity table 17 ("TABLE2").

In the next step 209, the addresses of updated data contained in log data are inserted into missing value positions. An UPDATE statement is issued for the address table 16, using higher-level addresses of updated data contained in the log data as a search key. That is, the following SQL statement is issued:

```
UPDATE SCHEMA1. TABLE1
SET COLUMN NAME = :H
WHERE X-PGCS COLUMN NAME = :H
``` where, in the "COLUMN NAME", the name of a column corresponding to the level of hierarchy of the self-address contained in the update log is described. The host variables (":H") corresponding the "COLUMN NAME" are the address value of the update data contained in the updated log. In the "X-pgcs", a concrete name of the higher-level PGCS column corresponding to the level of hierarchy of the higher-level address contained in the update log is described. The higher-level address contained in the update log is entered into the host variable (":H") thereof. The contents of the SQL statement are that the address value of the host variables (":H") corresponding to the "COLUMN NAME" are overwritten to the column specified by the "COLUMN NAME" of the record specified under "WHERE" condition in the specified address table 16 ("TABLE1").

When the processing of step 209 is carried out, this subroutine is ended and the process returns to the processing illustrated in FIG. 7, where processing for the next update log is executed.

If the result of the decision made in step 207 is that no missing values are present, then the process proceeds to step 210 where an INSERT statement is issued for the address table 16, with the update data overwritten to the records obtained in step 205. That is, the following SQL statement is issued:

```
INSERT INTO SCHEMA1. TABLE1
(A-PGCS, B-PGCS, C-PGCS, D-PGCS)
VALUES (:H, . . ., :H)
``` where the number of host variables (":H") is same as the number of columns excluding S-KEY in the address table 16 ("TABLE1"). The host variables (":H") are address values written by updating. The contents of this SQL statement are that a record in which address values of host variables (":H") are written to each of A=PGCS, . . . , D-PGCS is inserted to the specified address table 16 (TABLE1). In the processing of this step 210, address values of update data contained in the update log are written to their respective host variables (":H"). Missing values (NULL) are written to the host variables (":H") in lower-level columns than the column of the update data. Address values fetched in step 205 are written to other host variables (":H"). Because of the unique constraint, a new value is written to the column "S-KEY".

In the next step 211, an INSERT statement is issued for the real table 17, with the update data overwritten to records obtained in step 205. That is, the following SQL statement is issued:

```
INSERT INTO SCHEMA2. TABLE2
(DEVELOPING COMPANY, OPERATION DIVISION,
SECTION IN CHARGE, DEVELOPER)
VALUES (:H, . . ., :H)
``` where the number of the host variables (:H) is same as the number of columns excluding U-KEY in the entity table 17. The host variables (":H") are entity values written by the updating. The contents of this SQL statement are that a record in which entity value of host variables (":H") are written to the columns having the specified column names ("DEVELOPING COMPANY", "DEVELOPER"), respectively, is inserted to the specified entity table 17 (":H"). In the processing of this step 211, the entity values of updated data contained in the update log are written to their respective host variables (":H"). Missing values (NULL) are written to the host variables (":H") in lower-level columns than the column of the update data. Entity values fetched in step 205 are written to the other host variables (":H"). Because of the unique constraint, the same value as the value of S-KEY of a record inserted in step 210 is written to the column U-KEY.

When the processing of step 211 is carried out, this subroutine is ended and the process returns to the processing illustrated in FIG. 7, where processing for the next update log is executed.

Figure 9:
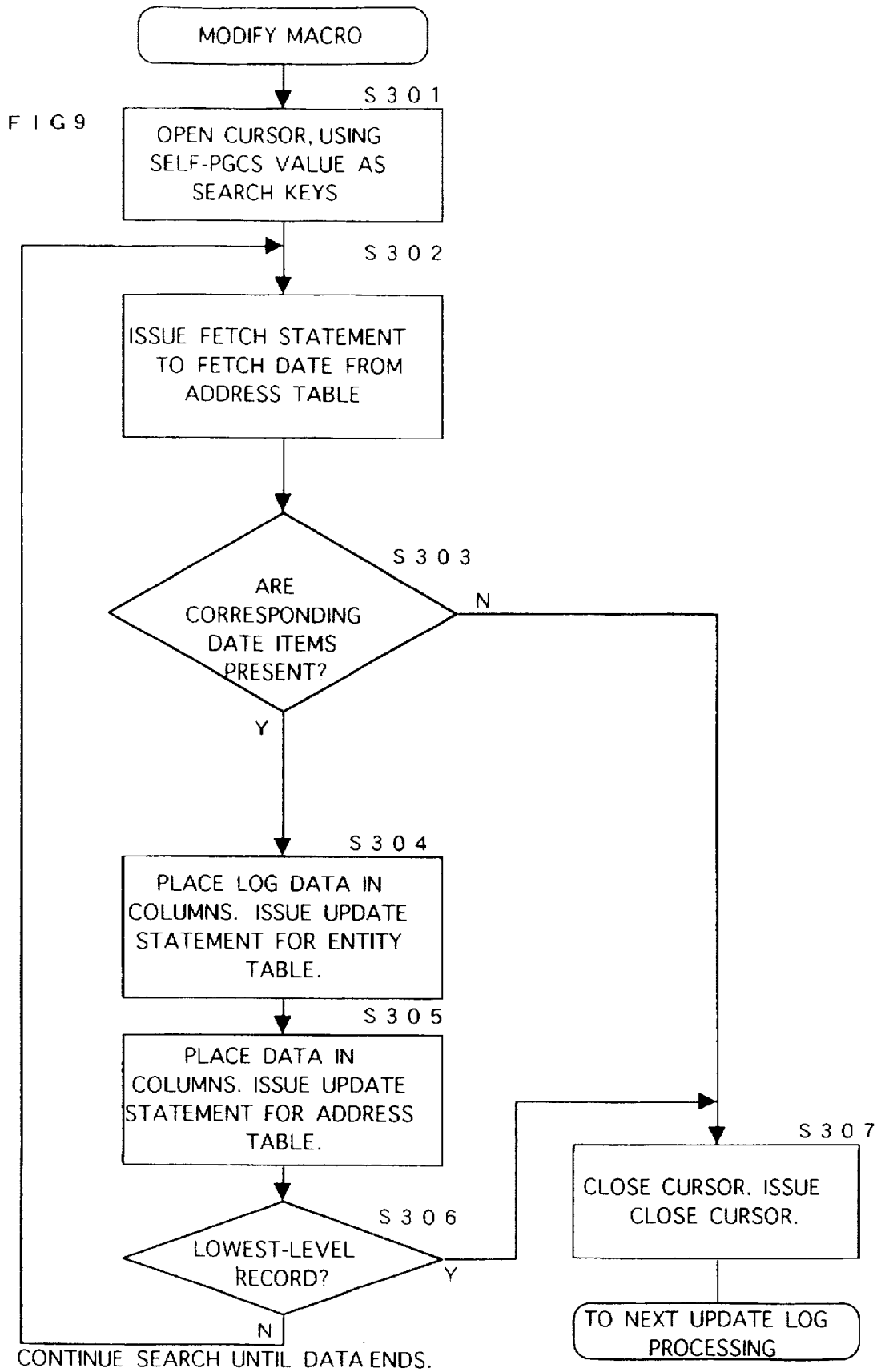
FIG. 9 is a flowchart illustrating a subroutine of MODIFY macro processing executed in step 108 of the processing illustrated in FIG. 7.

FIG. 9 illustrates a subroutine for MODIFY macro processing executed in step 108 illustrated in FIG. 7. In the first step 301 illustrated in FIG. 9, a cursor is opened, using the self-address (PGCS) value contained in the update log currently processed as a search key. That is, the following SQL statement is issued:

```
OPEN CUR1
SELECT * FROM SCHEMA1. TABLE1
WHERE Y-PGCS = :H
``` where "CUR1" is a example of name of the cursor declared. In the "Y-PGCS", a concrete name of the self-level pgcs column corresponding to the level of hierarchy of the self-address contained in the update log is described. The address value of update data contained in the update log is described into the host variables (":H"). The contents of this SQL statement are that a cursor ("CUR1") is declared such that all data items of records in which the address of the specified PGCS column agrees with host variables (":H") are fetched from the specified address table 16 ("TABLE1").

Then, the process proceeds to a loop beginning with step 302 and ending with step 306.

In step 302, data is fetched from the address table 16 with a FETCH statement. That is, the following SQL statement is issued:

FETCH CUR1
INTO :H, . . . , :H where the number of the host variables (":H") is same as the number of columns in the address table 16 ("TABLE1"). Only a definition is written to the host variables (":H"). The contents of this SQL statement are that a cursor ("CUR1") declared in step 301 is carried out to fetch data defined in terms of host variables (":H").

In the next step 303, a decision is made as to whether data corresponding to the definition of the cursor ("CUR1") exists as a result of search of step 302. If the corresponding data is absent, the process proceeds to step 307.

If the corresponding data is discovered in step 303, the process proceeds to step 304. In this step 304, an UPDATE statement is issued for the real table 17, with the log data entered into the corresponding column, and using the data fetched in step 302 as a search key. That is, the following SQL statement is issued:

```
UPDATE SCHEMA2. TABLE2
SET COLUMN NAMES = :H
WHERE U-KEY = :H
``` where, in the "COLUMN NAMES", concrete name of a column corresponding to the self-address contained in the update log is described. The host variable (":H") corresponding to the "COLUMN NAMES" are the entity value of updated data contained in the update log. The number of specified "COLUMN NAMES" is equal to data items contained in the update log. Into the host variables (":H") corresponding to the "U-KEY", the value of the S-KEY obtained in step 302 is entered. The contents of this SQL statement are that the entity value of the host variables (":H") corresponding to the "COLUMN NAMES" are overwritten to the column specified by the "COLUMN NAME" of a record specified under "WHERE" condition in the specified entity table 17 ("TABLE2").

In the next step 305, an UPDATE statement is issued for the address table 16 only if any address value is modified. In particular, an UPDATE statement is issued under the cursor condition declared in step 301, with log data entered into the corresponding column. That is, the following SQL statement is issued:

```
UPDATE SCHEMA1. TABLE1
SET COLUMN NAMES = :H
WHERE CURRENT OF CUR1
``` where, in the "COLUMN NAMES", the name of a column corresponding to the self-address contained in the update log is described. The host variables (":H") corresponding to the "COLUMN NAMES" are the address value of update data contained in the update log. The number of specified "COLUMN NAMES" is equal to the number of data items contained in the update log. The name of the cursor declared in step 301 is entered into the "CUR1". The contents of the SQL statement are that the address value of the host variables (":H") corresponding to the "COLUMN NAMES" are overwritten to the column specified by the "COLUMN NAME" of a record specified under the "WHERE" condition and contained in the specified entity table 17 ("TABLE2").

In the next step 306, a decision is made as to whether the record updated in step 305 is the record in the lowest row in the address table 16. If the record is in the lowest-row, the process proceeds to step 307. If the record is not in the lowest-row, the process returns to step 302, where an operation is performed to search for the next corresponding data item.

In step 307, the cursor ("CUR1")is closed. That is, the following SQL statement is issued:

CLOSE CUR1

After the processing of step 307, the process proceeds back to the processing illustrated in FIG. 7, where the next update log is processed.

Figure 10:
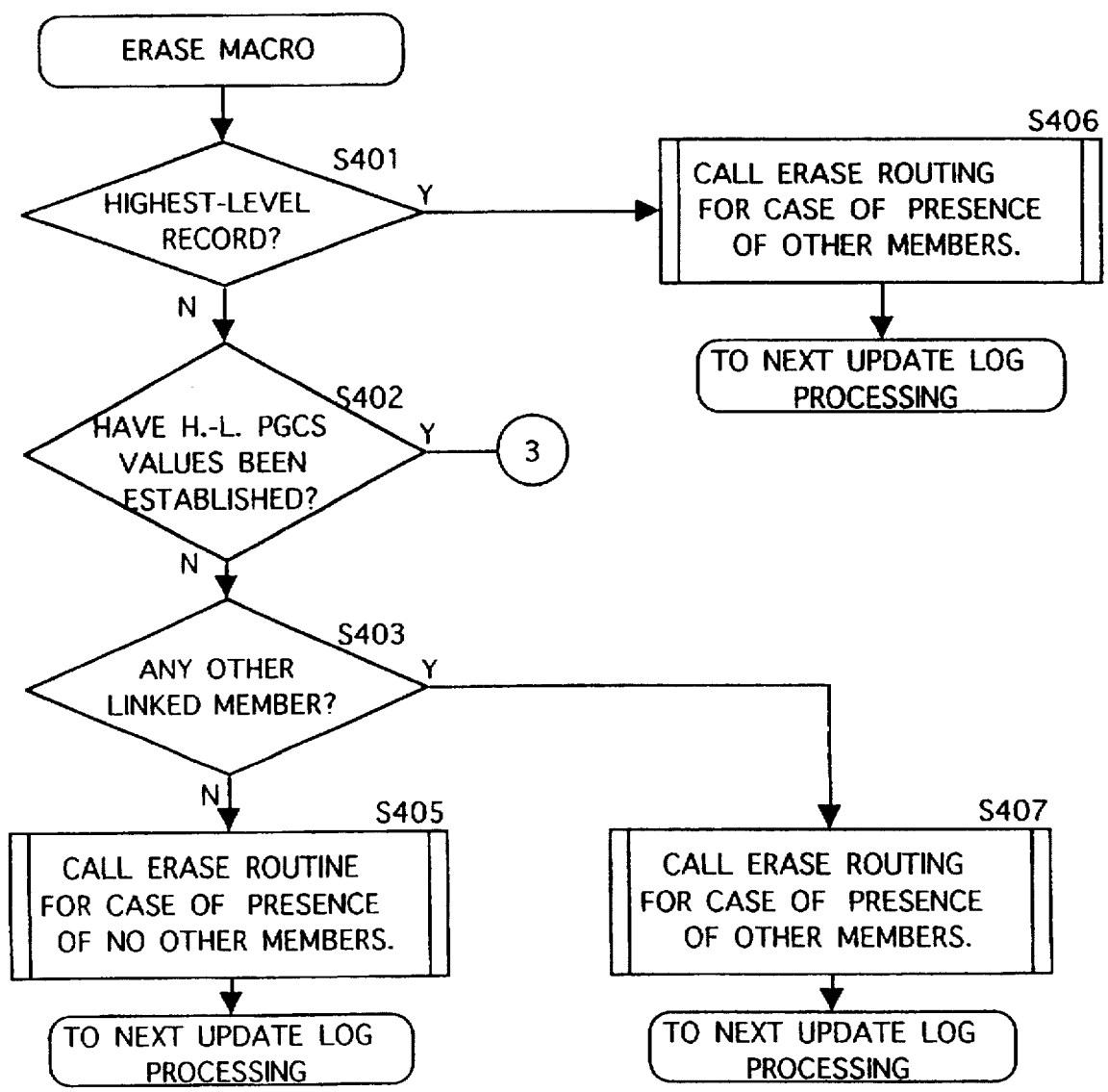
FIG. 10 is a flowchart illustrating a subroutine of ERASE macro processing executed in step 109 of the processing illustrated in FIG. 7.
Figure 11:
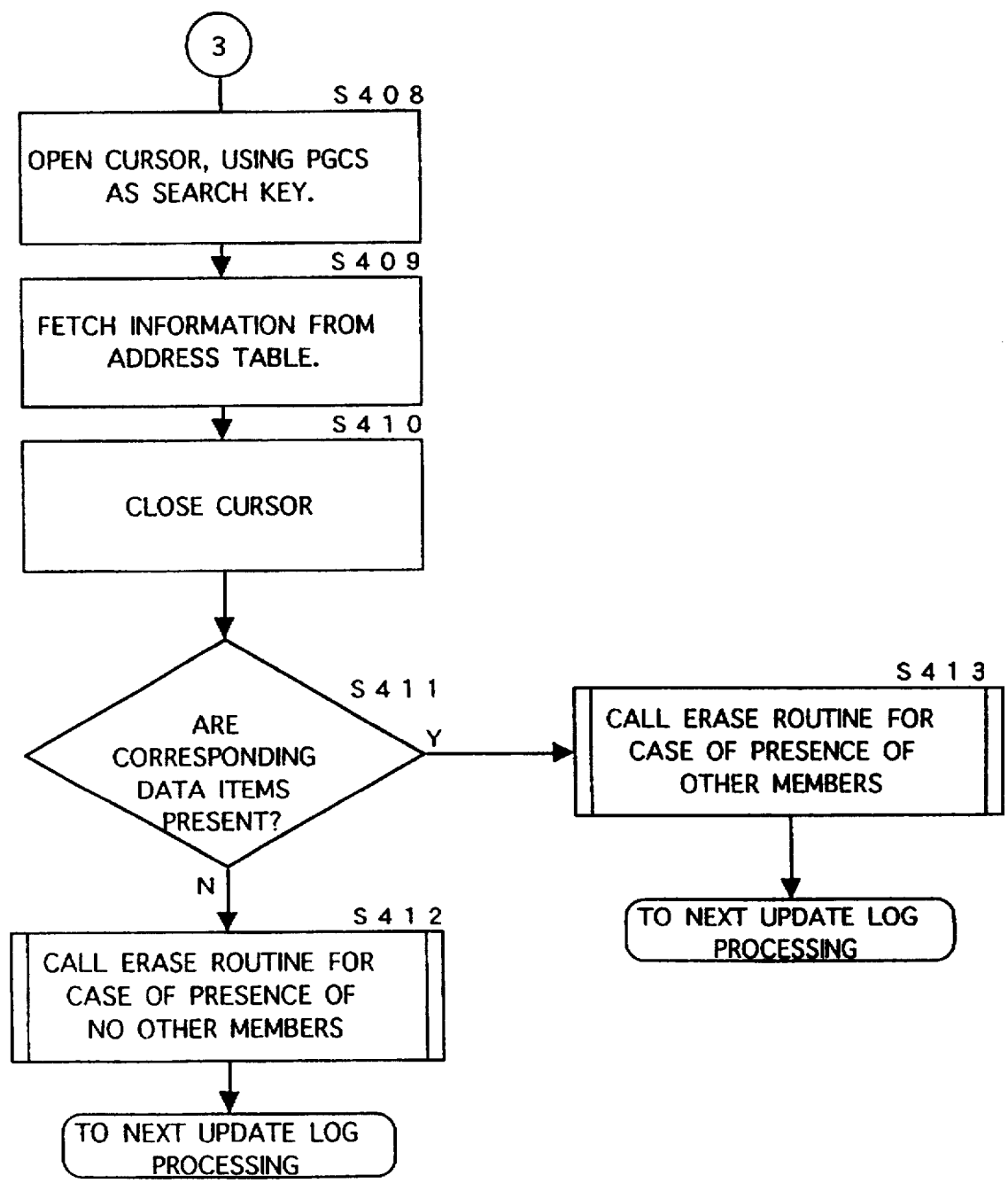
FIG. 11 is a flowchart illustrating processing executed in step 402 of the processing illustrated in FIG. 10 when higher-level PGCS values have been established.

FIGS. 10 and 11 illustrate a subroutine for ERASE macro processing executed in step 109 illustrated in FIG. 7.

In the first step 401 in FIG. 10, a decision is made as to whether the update log currently processed is to update a data located at the highest level of hierarchy in the network database 1. This decision depends on whether the update log contains a higher-level address.

If it is to update a data in a column at the highest level of hierarchy, an ERASE subroutine which is used when other member exists as illustrated in FIG. 12 is executed in step 406.

In the first step 501 in FIG. 12, a cursor is opened, using the self-address (PGCS) value contained in the update log currently processed as a search key. That is, the following SQL statement is issued:

```
OPEN CUR1
SELECT * FROM SCHEMA1. TABLE1
WHERE Y-PGCS = :H
``` where "CUR1" is a example of name of the cursor declared. In the "Y-PGCS", a concrete name of the self-level pgcs column corresponding to the level of hierarchy of the self-address contained in the update log is described. In the host variable (":H") thereof, the address value of update data contained in the update log is described. The contents of this SQL statement are that a cursor ("CUR1") is declared to fetch all data items of records whose specified PGCS column has addresses coincident with the host variables (":H") from the specified address table 16 ("TABLE1").

In step 502, data is fetched from the address table 16 with a FETCH statement. That is, the following SQL statement is issued:

FETCH CUR1
INTO :H, . . . . , :H where the number of the host variables (":H") is same as the number of columns in the address table 16 ("TABLE1"). Only the definition is written to the host variables (":H"). The contents of this SQL statement are that operation of the cursor ("CUR1") declared in step 501 is executed and that data defined in terms of the host variables (":H") is fetched.

In the next step 503, a decision is made as to whether any data item satisfies the definition of the cursor ("CUR1") as a result of the search in step 502. If no such data item exists, then the process proceeds to step 506.

If the result of the decision made in step 503 is that such a data item exists, then the process proceeds to step 504. In this step 504, a DELETE statement is issued for the real table 17, using the data fetched in step 502 as a search key. That is, the following SQL statement is issued:

```
DELETE SCHEMA2. TABLE2
SET COLUMN NAMES = :H
WHERE U-KEY = :H
``` where, in the "COLUMN NAMES", the name of a column corresponding to the level of hierarchy of the self-address contained in the update log is described. The host variables (":H") thereof is the entity value of the update data contained in the update log. The number of specified "COLUMN NAMES" is equal to the number of data items contained in the update log. Into the host variable (":H") corresponding to the "U-KEY", the same value as the value of the S-KEY obtained in step 502 is entered. The contents of this SQL statement are that the record of the specified entity table 17 ("TABLE2") which was specified under "WHERE" condition is deleted.

In the subsequent step 505, a DELETE statement is issued for the address table 16, using the cursor ("CUR1") declared in step 501 as a condition. That is, the following SQL statement is issued:

DELETE SCHEMA1. TABLE1
WHERE CURRENT OF CUR1

Inserted into this "CUR1" is the cursor name declared in step 501. The contents of this SQL statement are that the record of the specified address table 16 ("TABLE1") specified under "WHERE" condition is deleted. After the processing of step 505, the process proceeds to step 506.

In step 506, the cursor is closed. That is, the following SQL statement is issued:

CLOSE CUR1

When processing of this step 506 is finished, the ERASE subroutine for the case of presence of other member is ended. The process then proceeds to the processing illustrated in FIG. 10. If step 406 in FIG. 10 ends, the process returns to the processing illustrated in FIG. 7, where processing for the next log data is carried out.

If the result of decision made in step 401 illustrated in FIG. 10 is that the data is not to update a data in a column at the highest level of hierarchy, a decision is made as to whether the higher-level address (PGCS) value contained in the update log has been established (step 402). If the result of this decision is that the higher-level address (PGCS) value of the updated data is "FFFFFFFF", then this state is treated as not to have been established. If the higher-level address (PGCS) value has not been established, then control goes to step 403.

In this step 403, a decision is made as to whether there exists any other member or record linked to the same higher-level data (owner data) as the updated record is linked to. This decision is made by judging whether a flag inside the update log is set or reset. If such a linked member is present, the process proceeds to step 407. In this step 407, the ERASE subroutine for the case of presence of other member illustrated in FIG. 12 is executed, in the same way for in the case of step 406. When processing of this step 407 ends, the process proceeds back to the processing illustrated in FIG. 7, where processing for the next log data is carried out.

Figure 13:
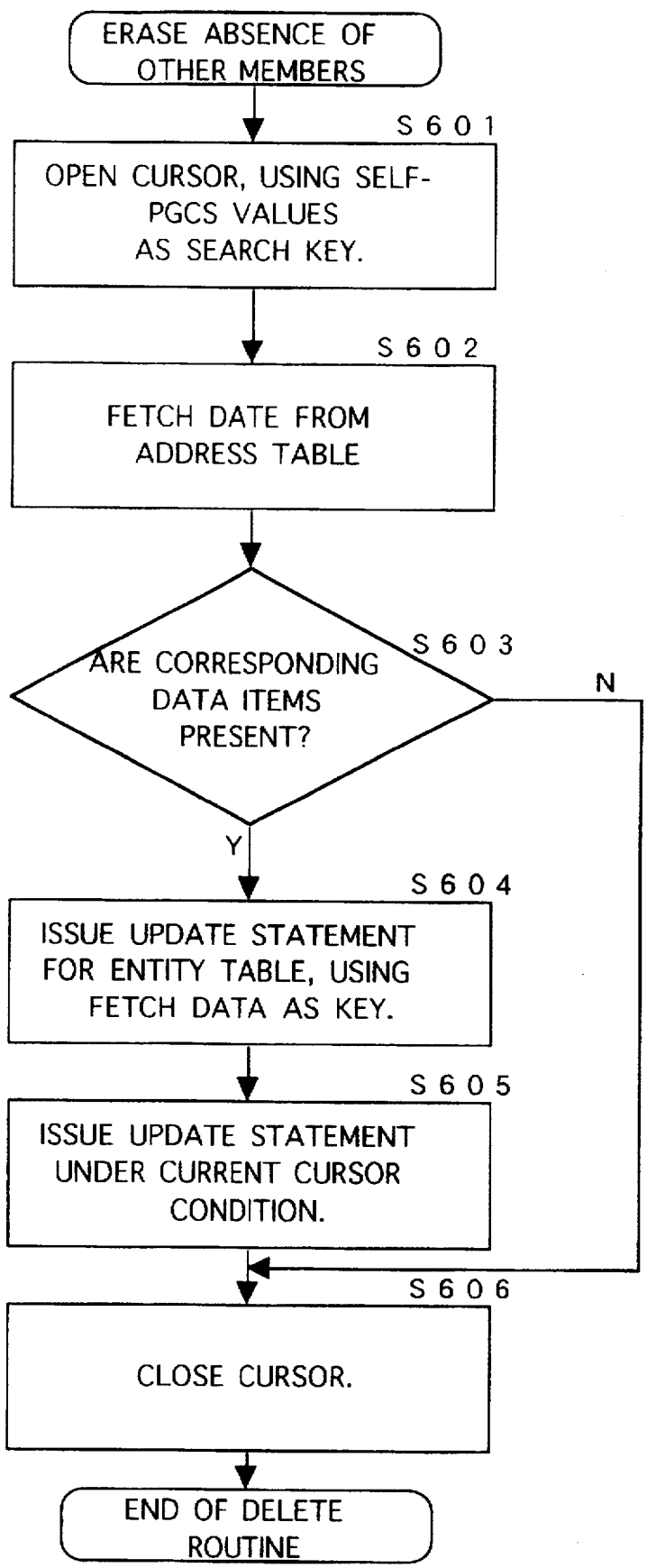
FIG. 13 is a flowchart illustrating an ERASE subroutine executed in step 405 of the processing illustrated in FIG. 10 or in step 412 of the processing illustrated in FIG. 11 when no other members are present.

If the result of decision made in step 403 is that any other member linked to the owner data does not exist, then the process proceeds to step 405, where the ERASE subroutine for the case of absence of other members as illustrated in FIG. 13 is executed.

In the first step 601 of the processing illustrated in FIG. 13, a cursor is opened, using the self-address (PGCS) value contained in the update log presently processed as a search key. That is, the following SQL statement is issued:

```
OPEN CUR1
SELECT * FROM SCHEMA1. TABLE1
WHEREY-PGCS = :H
``` where "CUR1" is a example of name of the cursor declared. In the "Y-PGCS", a concrete name of the self-level pgcs column corresponding to the level of hierarchy of the self-address contained in the update log is described. In the host variable (":H") thereof, the address value of the update data contained in the update log is described. The contents of this SQL statement are that a cursor ("CUR1") is declared such that all data items of records whose specified PGCS column has addresses coincident with the host variable (":H") are fetched from the specified address table 16 ("TABLE1").

In the next step 602, data is fetched from the address table 16 with a FETCH statement. That is, the following SQL statement is issued:

FETCH CUR1
INTO :H, . . . . , :H where the number of the host variables (":H") is same as the number of columns in the address table 16 ("TABLE1"). Only the definition is written to the host variables (":H"). The contents of this SQL statement are that operation of the cursor ("CUR1") declared in step 601 is executed to fetch the data defined in terms of the host variables (";H").

In the next step 603, a decision is made, based on the result of search done in step 602, as to whether data items satisfying the definition of the cursor ("CUR1") exist. If such data items do not exist, the process proceeds to step 606.

If the result of the decision made in step 603 is that such data items are present, then the process proceeds to step 604, where an UPDATE statement is issued for the entity table 17, using data fetched in step 602 as a search key. That is, the following SQL statement is issued:

```
UPDATE SCHEMA2. TABLE2
SET COLUMN NAMES = NULL
WHERE U-KEY = :H
``` where, in the "COLUMN NAMES", the name of a column of the entity table 17 ("TABLE2") which corresponds to the level of hierarchy of the self-address contained in the update log is described. The number of specified "COLUMN NAMES" is equal to the number of data items contained in the update log. Into the host variable (":H") corresponding to the "U-KEY", the same value as the value of the S-KEY obtained in step 602 is entered. The contents of this SQL statement are that the specified column of the record of the specified entity table 17 ("TABLE2") which was specified under "WHERE" condition is set to NULL.

In the following step 605, an UPDATE statement is issued for the address table 16 under the condition of the cursor declared in step 601. That is, the following SQL statement is issued:

```
UPDATE SCHEMA1. TABLE1
SET COLUMN NAMES = NULL
WHERE CURRENT OF CUR1
``` where, in the "COLUMN NAMES", the name of a column in the address table 16 ("TABLE1") which corresponds to the level of hierarchy of the self-address contained in the update log is described. The number of specified "COLUMN NAMES" agrees with the number of data items contained in the update log. The name of the cursor declared in step 601 is entered into the "CUR1". The contents of this SQL statement are that the specified column of the record in the specified address table 16 ("TABLE1") specified under "WHERE" condition is set to NULL. After processing of step 605, control goes to step 606.

In the step 606, the cursor is closed. That is, the following SQL statement is issued:

CLOSE CUR1

When the processing of this step 606 is finished, the ERASE subroutine for the case of presence of other member is ended, and the process returns to the processing illustrated in FIG. 10. In FIG. 10, if step 405 ends, the process proceeds back to the processing illustrated in FIG. 7, where processing for the next log data is carried out.

If the result of the decision made in step 402 is that the higher-level PGCS value has been established, then the process proceeds to step 408 (FIG. 11). In step 408, a cursor is opened, using the higher-level address (PGCS) value contained in the update log and the self-address (PGCS) value of the update data as search keys. That is, the following SQL statement is issued:

```
OPEN CUR1
SELECT * FROM SCHEMA1. TABLE1
WHERE X-PGCS = :H
AND NOT Y-PGCS = :H
``` where "CUR1" is a example of name of the cursor declared. In the "X-PGCS", a concrete name of the higher-level PGCS column corresponding to the level of hierarchy of the higher-level address contained in the update log is described. The higher-level address value of the update data contained in the update log is described into the host variable (":H") thereof. In the "Y-PGCS", a concrete name of the self-level pgcs column corresponding to the level of hierarchy of the self-address contained in the update log is described. The address value of the update data of the update log contained in the update log is described into the host variable (":H") thereof. The contents of this SQL statement are that a cursor ("CUR1") is declared such that it searches the specified address table 16 ("TABLE1") for a record whose higher-level address agrees with the host variable (":H") corresponding to the "X-PGCS" but whose self address does not agrees with the host variable (":H") corresponding to the "Y-PGCS" and it fetches all data items about that record.

In the subsequent step 409, data is fetched from the address table 16 with a FETCH statement. That is, the following SQL statement is issued:

FETCH CUR1
INTO :H, . . . . , :H where the number of the host variables (":H") is same as the number of columns in the address table 16 ("TABLE1"). It is to be noted that only the definition is written to the host variables (":H"). The contents of this SQL statement are that operation of the cursor ("CUR1") declared in step 408 is executed to fetch the data defined in terms of the host variables (":H").

In the next step 410, the cursor is closed. That is, the following SQL statement is issued:

CLOSE CUR1

The contents of this SQL statement are that end of use of the cursor ("CUR1") declared in step 408 is declared.

In the next step 411, a decision is made as to whether any data item satisfies the definition of the cursor as a result of the search in step 409. If such a data item does not exist, then the process proceeds to step 412. In this step 412, the ERASE subroutine (FIG. 13) for the case of presence of other member is executed, in the same way as in the case of step 405. When the processing of this step 412 ends, the process proceeds to the processing illustrated in FIG. 7, where processing for the next log data is effected.

If the result of the decision made in step 411 is that a corresponding data item exists, then the process proceeds to step 413. In this step 413, the ERASE subroutine (FIG. 12) for the case of presence of other member is executed, in the same way as in the case of step 406. When the processing of this step 413 ends, the process proceeds back to the processing illustrated in FIG. 7, where processing for the next log data is effected.

<Specific Examples of Updating>

Where data is updated in the manner described above, the states of the address table 16 and of the entity table 17 can take examples described below. It is assumed that the schema name of the address table 16 is "SCHEMA1", and that the table name is "TABLE1". It is also assumed that the schema name of the entity table 17 is "SCHEMA2", and that the table name is "TABLE2".

<Example 1 in the case where Modification is Made>

It is assumed that before updating, the network database 1 takes the state illustrated in FIG. 3, the address table 16 takes the state illustrated in FIG. 4, and the entity table 17 takes the state illustrated in FIG. 5.

Figures 14, 15:
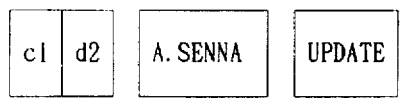
FIG. 14 is a diagram illustrating an update log created by the update log creating portion shown in FIG. 2 when a modification is made.
FIG. 15 is a diagram illustrating an entity table updated according to the update log illustrated in FIG. 14.

We now assume that data "YUZO KIMURA" existing at address d2 on the network database 1 is modified to "A. SENNA". An update log created in this case takes a structure as illustrated in FIG. 14. In FIG. 14, "UPDATE" indicates a method of update. The "A. SENNA" is the entity value of data after updating. Indicated by "d2" is the address of data to be updated, that is the self-address. Indicated by "c1" is the address of data at the next higher level of hierarchy (owner data) in the record of the updated data, that is higher-level address.

First, the MAP information file 8 is searched, based on this update log, to find the column name at the self-address on the address table 16 (step 102) and to obtain information about the column name on the entity table 17 (step 103). As a result, it has been found that the column name on the address table 16 is "D-PGCS" and that the column name on the entity table 17 is "developer".

Subsequently, a cursor is opened, based on this update log (step 301). In this case, the contents of the SQL statement are as follows:

```
OPEN CUR1
SELECT * FROM SCHEMA1. TABLE1
WHERE D-PGCS = :d2
```

Then, operation for this cursor is carried out (step 302). In this case, the contents of the SQL statement are as follows:

```
FETCH CUR1
INTO :A-PGCS, :B-PGCS, :C-PGCS, :D-PGCS,
S-KEY
```

As a result of the issue of this first FETCH statement, the following data is obtained:

"a1, b1, c1, d2, 000003"

If this data is obtained, the process proceeds from step 303 to 304. Based on this data, an UPDATE statement is issued for the entity table 17 (step 304). In this case, the contents of the SQL statement are as follows:

```
UPDATE SCHEMA 2. TABLE 2
SET DEVELOPER = :A. SENNA
WHERE U-KEY = :000003
```

In this way, the contents of the entity table 17 are modified as illustrated in FIG. 15. In this case, since the address value is not modified, the processing of step 305 is not performed.

Because the updated record is not the record positioned at the lowest row on the address table 16, the process is then returned to step 302 from the subsequent step 306. Therefore, a FETCH statement is reissued (step 306). However, at this time, no corresponding data exists and so the resulting response is AT-END (SQLSTATE2000: no data). Accordingly, the process gets out of the loop from step 303 and ends the processing.

<Example 2 in the case where Modification is Made>

It is assumed that before updating, the address table 16 takes the state illustrated in FIG. 4 and the entity table 17 takes the state illustrated in FIG. 15.

Figures 16, 17:
FIG. 16 is a diagram illustrating another update log created by the update log creating portion shown in FIG. 2 when a modification is made.
FIG. 17 is a diagram illustrating the entity table updated according to the update log illustrated in FIG. 16.

We now assume that data "THIRD DEVELOPING SECTION" existing at address c1 on the network database 1 is changed to "THIRD PROMOTING ROOM". An update log created in this case is structured as illustrated in FIG. 16. In FIG. 16, the "UPDATE" indicates a method of update. The "THIRD PROMOTING ROOM" indicates an entity value of data after updating. Indicated by "c1" is a self-address. Indicated by "b1" is a higher-level address.

First, the MAP information file 8 is searched, based on this update log, to find the column name at the self-address on the address table 16 (step 102) and to obtain information about the column table 17 he entity table 17 (step 103). As a result, it has been found that the column name on the address table 16 is "C-PGCS" and that the column name on the entity table 17 is "SECTION IN CHARGE".

Subsequently, a cursor is opened, based on this update log (step 301). In this case, the SQL statement is described as follows:

```
OPEN CUR1
SELECT * FROM SCHEMA1. TABLE1
WHERE C-PGCS = :c1
```

Then, operation for this cursor is carried out (step 302). In this case, the contents of the SQL statement are as follows:

```
FETCH CUR1
INTO :A-PGCS, :B-PGCS, :C-PGCS, :D-PGCS,
:S-KEY
```

As a result of the issue of this first FETCH statement, the following data is obtained:

"a1, b1, c1, d1, 000002"

If this data is obtained, the process proceeds from step 303 to 304. Based on this data, an UPDATE statement is issued for the entity table 17 (step 304). In this case, the contents of the SQL statement are as follows:

```
UPDATE SCHEMA2. TABLE2
SET SECTION IN CHARGE = :THIRD PROMOTING ROOM
WHERE U-KEY = :000002
```

In this case, since the address value is not modified, the processing of step 305 is not performed.

Because the updated record is not the lowest-level record on the address table 16, the process is then returned to step 302 from the subsequent step 306. Therefore, a FETCH statement is reissued (step 302).

As a result of the issue of this second FETCH statement, the following data is derived:

"a1, b1, c1, d2, 000003"

If this data is obtained, the process proceeds from step 303 to step 304. Based on this data, an UPDATE statement is issued for the entity table 17 (step 304). In this case, the contents of the SQL statement are follows:

```
UPDATE SCHEMA2. TABLE2
SET SECTION IN CHARGE = :THIRD PROMOTING ROOM
WHERE U-KEY = :000003
```

In this case, since the address value is not modified, the processing of step 305 is not performed. In this way, the contents of the entity table 17 are modified as illustrated in FIG. 17.

Because the updated record is not the record positioned at the lowest row on the address table 16, the process is then returned to step 302 from the subsequent step 306. Therefore, a FETCH statement is reissued (step 302). However, at this time, no corresponding data exists and so the resulting response is AT-END (SQLSTATE2000: no data). Accordingly, the process gets out of the loop from step 303 and terminates the processing.

<Example 1 in the case of Insertion>

It is assumed that before updating, the address table 16 takes the state illustrated in FIG. 4 and the entity table 17 takes the state illustrated in FIG. 17.

We now assume that "TOSHIAKI YAMADA" is added as a next lower-level data item to data item "SECOND DEVELOPING SECTION" existing at address c3 on the network database 1. An update log created in this case is organized as illustrated in FIG. 18. In FIG. 18, indicated by "INSERT" is a method of update. Indicated by "TOSHIAKI YAMADA" is the entity value of a data item after updating. Indicated by "d5" is a self-address. Indicated by "c3" is a higher-level address.

First, the MAP information file 8 is searched, based on this update log, to find the column name at the higher-level address on the address table 16 (step 102) and to obtain information about the column name at the self-address on the entity table 17 (step 103). As a result, it has been found that the column name at the higher-level address on the address table 16 is "C-PGCS" and that the column name at the self-address on the entity table 17 is "DEVELOPER".

Subsequently, a cursor is opened, based on this update log (step 204). In this case, the contents of the SQL statement are as follows:

```
OPEN CUR1
SELECT * FROM SCHEMA1. TABLE1, SCHEMA2. TABLE2
WHERE C-PGCS = :c3
AND S-KEY = U-KEY
```

Then, operation for this cursor is executed (step 205). In this case, the contents of the SQL statement are as follows:

```
FETCH CUR1
INTO :A-PGCS, :B-PGCS, :C-PGCS, :D-PGCS,
:S-KEY, :DEVELOPING COMPANY, :OPERATION DIVISION
:SECTION IN CHARGE, :DEVELOPER, :U-KEY
```

As a result of the issue of this FETCH statement, the following data is obtained:

```
"a1, b2, c3, d4, 000001, FUJITSU, FIRST
DEVELOPING DIVISION, SECOND DEVELOPING
SECTION, YUTAKA KAMADA, 000001 (see FIG. 19)"
```

If this data is obtained, the process proceeds from step 207 to step 210. Based on this data, an INSERT statement is issued for the address table 16. In this case, "d4" is merged with "d5", and a new value of 000005 is established as the S-KEY. That is, in this case, the contents of the SQL statement are as follows:

```
INSERT INTO SCHEMA1. TABLE1
(A-PGCS, B-PGCS, C-PGCS, D-PGCS, S-KEY)
VALUES (a1, b2, c3, d5, 000005)
```

Then, the obtained data item "YUTAKA KAMADA" is merged with "TOSHIAKI YAMADA", and a new value of 000005 is established as the U-KEY. In this way, a new record as shown in FIG. 20 is created. Based on this new record, an INSERT statement is issued for the entity table 17 (step 211). In this case, the contents of the SQL statement are as follows:

```
INSERT INTO SCHEMA2. TABLE2
(DEVELOPING COMPANY, OPERATION DIVISION,
SECTION IN CHARGE, DEVELOPER, U-KEY)
VALUES (FUJITSU, FIRST DEVELOPING
DIVISION, SECOND DEVELOPING SECTION, YUTAKA
KAMADA, 000005)
```

In this way, the contents of the entity table 17 are updated as illustrated in FIG. 21.

<Example 2 in the case of Insertion>

It is assumed that before updating, the entity table 17 takes the state illustrated in FIG. 21. "EDUCATIONAL SECTION" has been added as a next lower-level data item to data "FIRST DEVELOPING DIVISION" existing at address b2 on the network database 1. It is assumed that those who belong to this section are yet indeterminate. In this case, the created update log is organized as illustrated in FIG. 22. In FIG. 22, indicated by "INSERT" is a method of update. Indicated by "EDUCATIONAL SECTION" is the entity value of data after updating. Indicated by "c4" is a self-address. Indicated by "b2" is a higher-level address.

First, the MAP information file 8 is searched, based on this update log, to find the column name at the higher-level address on the address table 16 (step 102) and to obtain information about the column name at the self-address on the entity table 17 (step 103). As a result, it has been found that the column name at the higher-level address on the address table 16 is "B-PGCS" and that the column name at the self-address on the entity table 17 is "SECTION IN CHARGE".

Subsequently, a cursor is opened, based on this update log (step 204). In this case, the contents of the SQL statement are as follows:

```
OPEN CUR1
SELECT * FROM SCHEMA1. TABLE1, SCHEMA2. TABLE2
WHERE B-PGCS = :b2
AND S-KEY = U-KEY
```

Then, operation for this cursor is carried out (step 205). In this case, the contents of the SQL statement are as follows:

```
FETCH CUR1
INTO :A-PGCS, :B-PGCS, :C-PGCS, :D-PGCS,
:S-KEY, :DEVELOPING COMPANY, :OPERATION DIVISION,
:SECTION IN CHARGE, :DEVELOPER, :U-KEY
```

As a result of the issue of this FETCH statement, the following data is obtained:

```
"a1, b2, c3, d4, 000001, FUJITSU, FIRST
DEVELOPING DIVISION, SECOND DEVELOPING
SECTION, YUTAKA KAMADA, 000001 (see FIG. 23)"
```

If this data is obtained, the process proceeds from step 207 to step 210. Based on this data, an INSERT statement is issued for the address table 16. In this case, "c3" is merged with "c4", and "d4" is set to "NULL". A new value of 000006 is established as the S-KEY. That is, in this case, the contents of the SQL statement are as follows:

```
INSERT INTO SCHEMA1. TABLE1
(A-PGCS, B-PGCS, C-PGCS, D-PGCS, S-KEY)
VALUES (a1, b2, c4, NULL, 000006)
```

Then, the obtained data "SECOND DEVELOPING SECTION" is merged with the "EDUCATIONAL SECTION", and the "YUTAKA KAMADA" is merged with "NULL". A new value of 000006 is established as the U-KEY. In this manner, a new record as illustrated in FIG. 24 is created. Based on this new record, an INSERT statement is issued for the entity table 17 (step 211). In this case, the contents of the SQL statement are as follows:

```
INSERT INTO SCHEMA2. TABLE 2
(DEVELOPING COMPANY, OPERATION DIVISION,
SECTION IN CHARGE, DEVELOPER, U-KEY)
VALUES (FUJITSU, FIRST DEVELOPING DIVISION,
EDUCATIONAL SECTION, NULL, 0000006)
```

In this way, the contents of the entity table 17 are updated as illustrated in FIG. 25.

<Specific Example in the case of Erasure>

It is assumed that before updating, the entity table 17 assumes the state illustrated in FIG. 25.

Figure 26:
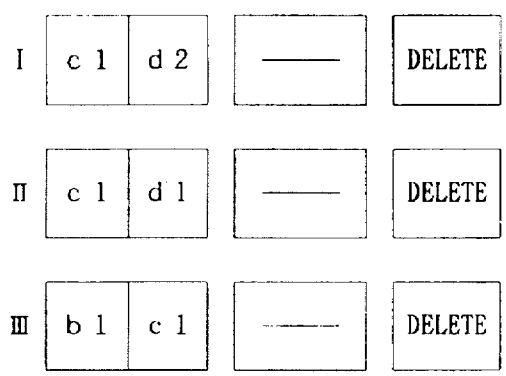
FIG. 26 is a diagram illustrating update logs created by the update log creating portion illustrated in FIG. 2 when an erasure is made.

We now assume that data "THIRD PROMOTING ROOM" existing at address c1 on the network 1 is deleted. At the same time, "YASUTAKA ODA (address: d1)" and "A. SENNA (address: d2)" which are member data items with respect to the "THIRD PROMOTING ROOM" are deleted. In this case, therefore, as illustrated in FIG. 26, three update logs I, II, and III are created. In the update log I, indicated by "DELETE" is a method of update. Indicated by "–(NULL)" is the entity value of data after update. Indicated by "d2" is a self-address. Indicated by "c1" is a higher-level address. In the update log II, indicated by "DELETE" is a method of update. Indicated by "–(NULL)" is the entity value of data after update. Indicated by "d1" is a self-address. Indicated by "c1" is a higher-level address. In the update log III, indicated by "DELETE" is a method of update. Indicated by "–(NULL)" is the entity value of data after update. Indicated by the "c1" is a self-address. Indicated by "b1" is a higher-level address.

[Processing, using Update Log I]

First, the MAP information file 8 is searched, based on this update log I, to find the column name at the higher-level address and at the self-address on the address table 16 (step 102) and to obtain information about the column name at the higher-level address and at the self-address on the entity table 17 (step 103). As a result, it has been found that the column names on the address table 16 includes "C-PGCS" for the higher-level address and "D-PGCS" for the self-address and that the column names on the entity table 17 includes "SECTION IN CHARGE" for the higher-level address and "DEVELOPER" for the self-address.

According to this update log I, the data item ("A. SENNA") to be updated is not at the highest level of hierarchy. Also, the higher-level PGCS value has been established. Therefore, the process proceeds to step 408 through steps 401 and 402. In this step 408, a cursor is opened according to the update log I. In this case, the contents of the SQL statement are as follows:

```
OPEN CUR1
SELECT * FROM SCHEMA1. TABLE1
WHERE C-PGCS = :c1
AND NOT D-PGCS = :d2
```

Then, operation for this cursor is effected (step 409). In this case, the contents of the SQL statement are as follows:

```
FETCH CUR1
  INTO :A-PGCS, :B-PGCS, :C-PGCS, :D-PGCS,
  :S-KEY
```

As a result of the issue of this FETCH statement, the following data is obtained:

"a1, b1, c1, d1, 000002"

As a result, we have confirmed that a record type which is linked to "THIRD PROMOTING ROOM" exists other than records which should be deleted according to the update log I. In order to erase the record currently updated, the process proceeds from step 411 to step 413. In the subroutine (FIG. 12) of step 413, a cursor is first opened according to the update log I (step 501). In this case, the contents of the SQL statement are as follows:

```
OPEN CUR1
SELECT * FROM SCHEMA1. TABLE1
WHERE D-PGCS = :d2
```

Then, operation for this cursor is carried out (step 502). In this case, the contents of the SQL statement are as follows:

```
FETCH CUR1
  INTO :A-PGCS, :B-PGCS, :C-PGCS, :D-PGCS,
  :S-KEY
```

As a result of the issue of this FETCH statement, the following data is obtained:

"a1, b1, c1, d2, 000003"

If this data is obtained, the process proceeds from step 503 to step 504. Based on this data, a DELETE statement is issued for the entity table 17 (step 504). In this case, the contents of the SQL statement are as follows:

DELETE SCHEMA2. TABLE2

WHERE U-KEY=:000003

In this way, the contents of the entity table 17 are updated as illustrated in FIG. 27.

Thereafter, a DELETE statement is issued for the address table 16, based on data obtained with a FETCH statement (step 505). In this case, the contents of the SQL statement are as follows:

DELETE SCHEMA1. TABLE1

WHERE CURRENT OF CUR1

[Processing, using Update Log II]

Subsequently, processing is performed with the update log II.

First, the MAP information file 8 is searched, based on this update log II, to find a column at a higher-level address and at a self-address on the address table 16 (step 102) and to obtain information about a column name on the entity table 17 at the higher-level address and at the self-address (step 103). As a result, it has been found that the column names on the address table 16 includes "C-PGCS" for the higher-level address and "D-PGCS" for the self-address and that the column names on the entity table 17 includes "SECTION IN CHARGE" for the higher-level address and "DEVELOPER" for the self-address.

According to this update log II, the data ("YASUTAKA ODA") to be updated is not at the highest level of hierarchy. Also, the higher-level PGCS value has been established. Therefore, the process proceeds to step 408 through steps 401 and 402. In this step 408, a cursor is opened according to the update log II. In this case, the contents of the SQL statement are as follows:

```
OPEN CUR1
SELECT * FROM SCHEMA1. TABLE1
WHERE C-PGCS = c1
AND NOT D-PGCS = :d1
```

Then, operation for this cursor is carried out (step 409). In this case, the contents of the SQL statement are as follows:

```
FETCH CUR1
  INTO :A-PGCS, :B-PGCS, :C-PGCS, :D-PGCS,
  :S-KEY
```

As a result of the issue of this FETCH statement, the following data is obtained:

"AT-END (SQLSTATE02000: no data)"

As a result, we have confirmed that no record type which is linked to "THIRD PROMOTING ROOM" exists other than records which should be deleted according to the update log II. In order to set the record currently updated to NULL, the process proceeds from step 411 to step 412. In the subroutine (FIG. 13) of step 412, a cursor is first opened according to the update log II (step 601). In this case, the contents of the SQL statement are as follows:

```
OPEN CUR1
  SELECT * FROM SCHEMA1.TABLE1
  WHERE D-PGCS = :d1
```

Then, operation for this cursor is carried out (step 602). In this case, the contents of the SQL statement are as follows:

```
FETCH CUR1
  INTO :A-PGCS, :B-PGCS, :C-PGCS, :D-PGCS,
  :S-KEY
```

As a result of the issue of this FETCH statement, the following data is obtained:

"a1, b1, c1, d1, 000002"

If this data is obtained, the process proceeds from step 603 to step 604. Based on this data, an UPDATE statement is issued for the entity table 17 (step 604). In this case, the contents of the SQL statement are as follows:

```
UPDATE SCHEMA2.TABLE2
  SET DEVELOPER = NULL
  WHERE U-KEY = :000002
```

In this way, the contents of the entity table 17 are updated as illustrated in FIG. 28.

Subsequently, based on data obtained with a FETCH statement, a DELETE statement is issued for the address table 16 (step 605). In this case, the contents of the SQL statement are as follows:

```
UPDATE SCHEMA1.TABLE1
  SET D-PGCS = NULL
  WHERE CURRENT OF CUR1
```

In this way, the contents of the address table 16 are updated as illustrated in FIG. 29.

[Processing, using Update Log III]

Subsequently, processing is performed with the update log III.

First, the MAP information file 8 is searched, based on this update log III, to find a column name at a higher-level address and at a self-address on the address table 16 (step 102) and to obtain information about a column name on the entity table 17 at the higher-level address and at the self-address (step 103). As a result, it has been found that the column names on the address table 16 includes "B-PGCS" for the higher-level address and "C-PGCS" for the self-address and that the column names on the entity table 17 includes "OPERATION DIVISION" for the higher-level address and "SECTION IN CHARGE" for the self-address.

According to this update log III, the data ("THIRD PROMOTING ROOM") to be updated is not at the highest level of hierarchy. Also, the higher-level PGCS value has been established. Therefore, the process proceeds to step 408 through steps 401 and 402. In this step 408, a cursor is opened according to the update log III. In this case, the contents of the SQL statement are as follows:

```
OPEN CUR1
  SELECT * FROM SCHEMA1.TABLE1
  WHERE B-PGCS = :b1
  AND NOT C-PGCS = :c1
```

Then, operation for this cursor is carried out (step 409). In this case, the contents of the SQL statement are as follows:

```
FETCH CUR1
  INTO :A-PGCS, :B-PGCS, :C-PGCS, :D-PGCS,
  :S-KEY
```

As a result of the issue of this FETCH statement, the following data is obtained:

"a1, b1, c2, d3, 000004"

As a result, we have confirmed that a record type which is linked to "SECOND DEVELOPING DIVISION" exists other than records which should be deleted according to the update log III. In order to erase the record currently updated, the process proceeds from step 411 to step 413. In the subroutine (FIG. 12) of step 413, a cursor is first opened according to the update log III (step 501). In this case, the contents of the SQL statement are as follows:

```
OPEN CUR1
  SELECT * FROM SCHEMA1.TABLE1
  WHERE C-PGCS = :c1
```

Then, operation for this cursor is performed (step 502). In this case, the contents of the SQL statement are as follows:

```
FETCH CUR1
  INTO :A-PGCS, :B-PGCS, :C-PGCS, :D-PGCS,
  :S-KEY
```

As a result of the issue of this FETCH statement, the following data is obtained:

"a1, b1, c1, NULL, 000002"

If this data is obtained, the process proceeds from step 503 to step 504. Based on this data, a DELETE statement is issued for the entity table 17 (step 504). In this case, the contents of the SQL statement are as follows:

DELETE SCHEMA2.TABLE2
WHERE U-KEY=:000002 In this way, the contents of the entity table 17 are updated as illustrated in FIG. 30.

Subsequently, based on data obtained with a FETCH statement, a DELETE statement is issued for the address table 16 (step 505). In this case, the contents of the SQL statement are as follows:

DELETE SCHEMA1.TABLE1
WHERE CURRENT OF CUR1

In this way, the contents of the address table 16 are updated as illustrated in FIG. 31.

<Example 3 in the case of Insertion>

It is assumed that before updating, the address table 16 takes the state illustrated in FIG. 31 and the entity state 17 takes the state illustrated in FIG. 30.

We now assume that "KATSUTOSHI MASATOMI" is added as a lower-level data item to data "EDUCATIONAL SECTION" existing at address c4 on the network database 1. An update log created in this case is organized as illustrated in FIG. 32. In FIG. 32, indicated by "INSERT" is a method of update. Indicated by "KATSUTOSHI MASATOMI" is the entity value of data after updating. Indicated by "d6" is a self-address. Indicated by "c4" is a higher-level address.

First, the MAP information file 8 is searched, based on this update log, to find a column name at a higher-level address on the address table 16 (step 102) and to obtain information about a column name on the entity table 17 at the self-address (step 103). As a result, it has been found that the column name on the address table 16 at the higher-level address is "C-PGCS" and that the column name on the entity table 17 at the self-address is "DEVELOPER".

Then, a cursor is opened according to this update log (step 204). In this case, the contents of the SQL statement are as follows:

```
OPEN CUR1
SELECT * FROM SCHEMA1. TABLE1, SCHEMA2. TABLE2
WHERE C-PGCS = :c4
AND S-KEY = U-KEY
```

Then, operation for this cursor is performed (step 205). In this case, the contents of the SQL statement are as follows:

```
FETCH CUR1
INTO :A-PGCS, :B-PGCS, :C-PGCS, :D-PGCS,
:S-KEY, :DEVELOPING COMPANY, :OPERATION DIVISION,
:SECTION IN CHARGE, :DEVELOPER, :U-KEY
```

As a result of the issue of this FETCH statement, the following data is obtained:

```
"a1, b2, c4, NULL, 000006, FUJITSU, FIRST
DEVELOPING DIVISION, EDUCATIONAL SECTION, NULL,
0000006 (see FIG. 33)"
```

If this data is obtained, the result of the decision made in step 207 is that the result of search has missing values. Therefore, the process from step 207 to step 208. Based on this data, an UPDATE statement is issued for the real table 17 (step 208). In this case, the obtained data "NULL" is merged with "KATSUTOSHI MASATOMI". That is, the contents of this SQL statement are as follows:

```
UPDATE SCHEMA2. TABLE2
SET DEVELOPER = :KATSUTOSHI MASATOMI
WHERE U-KEY = :000006
```

In this way, the contents of the entity table 17 are updated as illustrated in FIG. 34.

Similarly, an UPDATE statement is issued for the address table 16, based on the obtained data (step 209). In this case, "NULL" is merged with "d6". In this case, the contents of this SQL statement are as follows:

```
UPDATE SCHEMA1. SCHEMA1
SET D-PGCS = :d6
WHERE C-PGCS = :c4
```

In this way, the contents of the address table 16 are updated as illustrated in FIG. 35.

In this manner, in the present embodiment, only a necessary part of the real table 17 can be updated by extracting update information from update log.

SECOND EMBODIMENT

Figure 36:
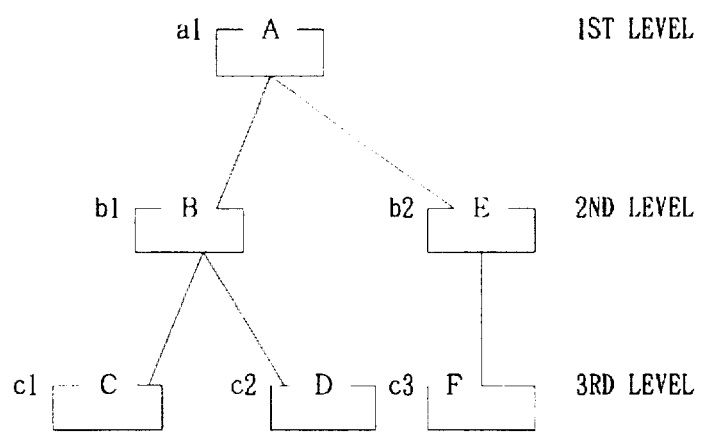
FIG. 36 is a diagram illustrating a network database in a database system according to a third embodiment of the present invention.
Figure 37:
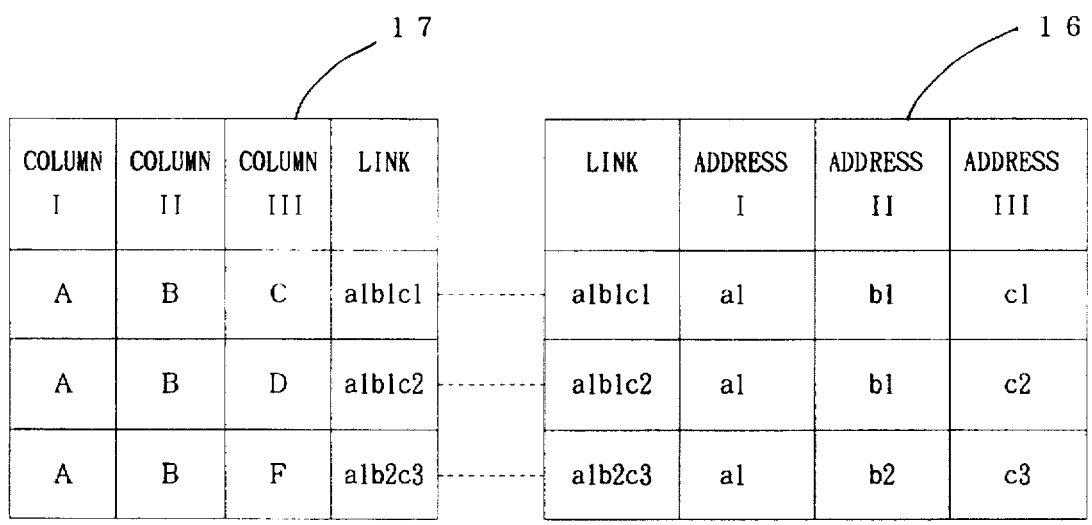
FIG. 37 is a diagram illustrating an entity table and an address table used in the database system illustrated in FIG. 36.

FIGS. 36–38 illustrate a third embodiment of database system according to the present invention. This third embodiment is similar to the second embodiment except that the uniqueness assuring key acting as a uniqueness display portion has a different structure. Therefore, the system structure of the third embodiment is exactly the same as the system structure of the second embodiment. The processing of the second embodiment illustrated by the flowcharts described above can be regarded as processing of the third embodiment by replacing "S-KEY" and "U-KEY" in the second embodiment with "LINK". Hence, only network database 1, address table 16, and entity table 17 are described here.

<Data Structure of Network Database 1>

FIG. 36 illustrates an example of data structure inside the network database 1. As illustrated in FIG. 36, each data item is interrelated so as to form a hierarchical structure inside the network database 1. Specifically, the entity value of a data item at the highest level of hierarchy, i.e., the first level, is A (address value=a1). The entity values of data items at the second level are B (address value=b1) and E (address value=b2), respectively. The entity values of data items at the third level are C (address value=c1), D (address value= c2), and F (address value=c3), respectively.

In the present embodiment, only one data item (A) exists at the owner position as mentioned previously. Data items at the lower level of hierarchy are correlated to only one data item (owner data) at the highest level. That is, an inverted tree structure is formed. The branches of this tree extending from the data item at the owner position to certain data items at the lowest level are known as records.

<Data Structure of Address Table 16>

The address table 16 illustrated in FIG. 37 is a table added to the relational database 11. During an initial extraction operation precedent to updating of the network database 1, the address table 16 is created from the address values of record types, or data items, in the network database 1.

The address table 16 is a two-dimensional table in which the horizontal parts, or rows, indicate records, while the vertical parts indicate columns. Every record in the address table 16 corresponds to any one of the records in the network database 1. Of the various columns of the address table 16, ADDRESS I corresponds to the first level of hierarchy of the network database 1. ADDRESS II corresponds to the second level. ADDRESS III corresponds to the third level. A column referred to as "LINK" is a uniqueness assuring column acting as a uniqueness display portion.

Information written to the address table 16 is address values of data items written to those positions in the network database 1 which correspond to their records and their columns. Since the number of records in the address table 16 is coincident with the number of records in the network database 1, the same address value is written to plural records.

Information written to the column LINK is a value consecutively linking the addresses of all data items contained in its record.

<Data Structure of Entity Table 17 (User's Table)>The entity table 17 illustrated in FIG. 37 is a table which acts as an intrinsic relational database holding entity values.

The entity table 17 is a two-dimensional table in which the horizontal parts, or rows, indicate records, while the vertical parts indicate columns. Every record in the entity table 17 corresponds to any one of the records in the network database 1. However, it is not necessary that the order of the records in the entity table 17 be coincident with the order of the records in the database table 1. Of the various columns of the entity table 17, COLUMN I corresponds to the first level of hierarchy of the network database 1. COLUMN II corresponds to the second level. COLUMN III corresponds to the third level. A column referred to as "U-KEY" is a uniqueness assuring column acting as a uniqueness display portion.

Information written to the entity table 17 is none other than entity values written to those positions in the network database 1 which correspond to their records and their columns. Since the number of records in the entity table 17 is coincident with the number of records in the network database 1, the same entity value is written to plural records.

Information written to the column LINK is a value consecutively linking the addresses of all data items contained in each record. A record in the address table 16 corresponding to a record in the network database 1 and a record in the entity table 17 corresponding to the same record in the database 1 have the same value. Therefore, as illustrated in FIG. 37, a record in the entity table 17 corresponding to a certain record in the address table 16 can be located by comparing the value of the column LINK (key LINK) in the address table 16 with the value of the column LINK (key LINK) in the real table 17.

<Summary of Updating>

Processing according to the present embodiment is carried out, in principle, according to the flow of processing in the second embodiment. Therefore, only updating in the processing is described briefly here.

It is assumed that the data item of record type B on the network database 1 has been changed to B+. The following is extracted as an update log:

---
self-address: b1
data (entity value): B+
method of update: UPDATE
---

The network database 1 receiving this update log decides to modify data and searches the address table 16 for the key LINK of a record having a self-address of b1. As a result, information indicating that the key LINK=a1b1c1, a1b1c2 is obtained.

Then, the entity table 17 is searched for a record having a key LINK having the same value as the above-described value. The data in the column corresponding to the record type B in that record is changed to B+. In this way, the contents of the entity table 17 are changed as illustrated in FIG. 38.

According to the present invention, the contents of updating of data in the network database can be quickly reflected in the relational database. Also, the contents of updating of data in the network database can be reflected in the relational database only by updating a part of the relational database.

While the present invention has been described thus far, it will be obvious to those skilled in the art that the same may be varied in various ways. Such variations should not be regarded as a departure from the spirit and scope of the invention, and all such modifications are intended to be included within the scope of the following claims.

What is claimed is:

1. A database storing system having a network database for storing data items in a hierarchical structure creating a data hierarchy and a relational database for storing data items in a table having rows and columns organized so as to correspond to the data hierarchy of said network database, the database system comprising:

an address table having rows, said address table storing address of data items of each record of the network database, each record comprising each data item in each link from a data item positioned in a highest level of the data hierarchy through a data item positioned in a lowest level of the data hierarchy, each record of the network database being stored in one row of said address table respectively, the storage position of each address related to a storage position of a corresponding data item in said relational database;

an update log data acquisition means which, when a data item in network database is updated, acquires update log data containing an address and a content of the updated data item;

an address storage position searching means for searching said address table for an address storage position of the updated data item according to the update log data acquired by said update log data acquisition means;

an update position specifying means for specifying a position of a data item in the relational database corresponding to the address storage position of the updated data item in said address table found by said address storage position searching means; and a data updating means for updating the data items in the relational database specified by said update position specifying means according to the content of the updated data item contained in the update log data.

2. The database system according to claim 1, wherein the relational database and said address table is provided with a uniqueness display portion, and wherein a value of the uniqueness display portion in a certain row of the relational database is correlated to a value of the uniqueness display portion in a corresponding row of said address table.

3. The database system according to claim 2, wherein the uniqueness display portions are provided in certain columns of the relational database and said address table, respectively.

4. The database system according to claim 1, wherein if information about any address in the network database is modified, said data updating means updates information about the corresponding address in said address table according to contents of the modification.

5. The database system according to claim 1, wherein said address storage position searching means searches said address table for a row containing an address which is the same as contained in said update log data according to the update log data.

6. The database system according to claim 5, wherein said update position specifying means specifies a row in the relational database corresponding to a row in said address table found by said address storing position searching means and specifies a column in the relational database according to an address contained in said update log data.

7. The database system according to claim 6, wherein each column of said address table has a column name, and wherein each column of the relational database has a column name.

8. The database system according to claim 7, further comprising:

an information table specifying a relation between the addresses and column names of said address table; and wherein said address storage position searching means fetches a column name on said address table corresponding to an address contained in the update log data from said information table and specifies a row in said address table in terms of the column name and the address contained in the update log data.

9. The database system according to claim 7, further comprising an information table specifying a relation between the addresses and column names of the relational database, and wherein said update position specifying means fetches a column name from the relational database corresponding to an address contained in the update log data from said information table and specifies a position of a data item in the relational database in terms of the column name and the specified row.

10. The database system according to claim 1, further comprising an update log file for accumulating said update log data.

11. A method of updating data in a database system having a network database for storing data items in a hierarchical structure creating a data hierarchy and a relational database for storing the same data items in a table organized to correspond to the data hierarchy of the network database, the table having a row for each record of the network database, the method comprising the steps of:

specifying addresses of data items in the network database and positions of the corresponding data items in the relational database, using a table;

when a data items in the network database is undated, obtaining an update log data containing an address and content of the updated data item;

searching said table for an address storage position of the updated data item according to the address of the updated data item contained in the update log data;

specifying a data item in the relational database corresponding to the address storage positions; and updating the specified data item in the relational database according to the content of the updated item contained in the update log data.

\* \* \* \* \*